(12) United States Patent
Vaghani

(10) Patent No.: US 8,266,099 B2
(45) Date of Patent: Sep. 11, 2012

(54) OFFLOADING STORAGE OPERATIONS TO STORAGE HARDWARE USING A THIRD PARTY SERVER

(75) Inventor: Satyam B. Vaghani, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 548 days.

(21) Appl. No.: 12/129,376

(22) Filed: May 29, 2008

(65) Prior Publication Data

US 2009/0300023 A1  Dec. 3, 2009

(51) Int. Cl.
*G06F 17/30* (2006.01)
*G06F 17/00* (2006.01)
(52) U.S. Cl. ............... 707/609; 707/821; 710/15
(58) Field of Classification Search .......... 707/609, 707/821; 710/15
See application file for complete search history.

(56) References Cited

U.S. PATENT DOCUMENTS

| | | | |
|---|---|---|---|
| 6,269,382 B1 * | 7/2001 | Cabrera et al. ................ 1/1 |
| 6,678,752 B1 * | 1/2004 | Ashton et al. ................ 710/15 |
| 7,152,149 B2 * | 12/2006 | Shimada et al. ............ 711/165 |
| 7,225,314 B1 | 5/2007 | Bonwick et al. |
| 7,263,108 B2 | 8/2007 | Kizhepat |
| 7,284,104 B1 | 10/2007 | Wu et al. |
| 7,529,897 B1 | 5/2009 | Waldspurger et al. |
| 7,653,794 B2 | 1/2010 | Michael et al. |
| 7,937,393 B2 | 5/2011 | Prahlad et al. |
| 7,941,501 B2 | 5/2011 | McCabe et al. |
| 8,001,339 B1 * | 8/2011 | Holdman et al. ............ 711/159 |
| 2002/0166026 A1 | 11/2002 | Ulrich et al. |
| 2004/0221123 A1 | 11/2004 | Lam et al. |
| 2006/0143476 A1 | 6/2006 | McGovern |
| 2006/0206603 A1 | 9/2006 | Rajan et al. |
| 2006/0277383 A1 | 12/2006 | Hayden et al. |
| 2008/0005146 A1 | 1/2008 | Kubo et al. |

OTHER PUBLICATIONS

International Search Report (Jul. 16, 2009), International Application No. PCT/US2009/03548, 13 pages.

* cited by examiner

*Primary Examiner* — Yicun Wu

(57) ABSTRACT

In a computer system with a disk array that has physical storage devices arranged as logical storage units and is capable of carrying out hardware storage operations on a per logical storage unit basis, a third party server is provided to offload storage operations from a file system to storage hardware. The third party server transfers configuration information associated with composite storage operations to the physical storage devices through an out-of-band path to enable composite storage operations to be executed without involving the file system.

21 Claims, 18 Drawing Sheets

OFFLOADING STORAGE OPERATIONS TO STORAGE HARDWARE USING A THIRD PARTY SERVER

CROSS REFERENCE TO RELATED APPLICATIONS

This application is related to (1) U.S. patent application Ser. No. 12/129,409 filed on the same date, and entitled "Offloading Storage Operations to Storage Hardware Using a Switch," and (2) U.S. patent application Ser. No. 12/129,323 filed on the same date, and entitled "Offloading Storage Operations to Storage Hardware."

BACKGROUND OF THE INVENTION

Enterprise storage systems employ disk arrays that are physically independent enclosures containing a disk array controller, a disk cache and multiple physical disk drives. The disk array controller manages the physical disk drives and exposes them to connected computer systems as logical data storage units, each identified by a logical unit number (LUN), and enable storage operations such as cloning, snapshotting, mirroring and replication to be carried out on the data storage units using storage hardware.

Computer systems that employ disk arrays are typically configured with a file system that executes a logical volume manager. The logical volume manager is a software or firmware component that organizes a plurality of data storage units into a logical volume. The logical volume is available in the form of a logical device with a contiguous address space on which individual files of a file system are laid out. The mapping of the logical volume to the data storage units is controlled by the file system and, as a result, disk arrays do not know how individual files are laid out on the data storage units. Therefore, a disk array cannot invoke its hardware to carry out storage operations such as cloning, snapshotting, mirroring and replication on a per-file basis.

One possible solution for carrying out storage operations in a disk array on a per-file basis is to add storage metadata in data structures managed by the disk array. Disk arrays, however, are provided by a number of different vendors and storage metadata varies by vendor. This solution is not attractive because the file system would then need to be customized for each different vendor. For this reason, storage operations such as cloning, snapshotting, mirroring and replication of files have been typically carried out using software techniques through traditional standard file system calls.

SUMMARY OF THE INVENTION

One or more embodiments of the invention provide primitives that enable offloading of storage operations to storage hardware on a per-file basis. These primitives include instructions for zeroing file blocks, cloning file blocks, and deleting file blocks, and these instructions support higher-level applications such as instant provisioning and thin provisioning.

One embodiment of the invention provides a method for offloading storage operations from a file system to a storage system having storage devices using a third party server and out of band paths that bypass the file system. The method includes the steps of receiving a composite storage operation for the storage system, obtaining location information from the file system for a file that is stored on the storage devices, and generating configuration information associated with the composite storage operation at the third party server and supplying the configuration information and the location information to the storage system.

Another embodiment of the invention provides a computer system having a host computer configured to provide a file system that maintains location information for files The host computer is connected to a storage system having storage devices that are presented to the host computer as one or more logical storage units. In this computer system, a composite storage operation is received for the storage system, location information is obtained from the file system for a file that is stored on the storage system, and configuration information associated with the composite storage operation is generated by the third party server and supplied to the storage system with the location information.

DETAILED DESCRIPTION

Figure 1A:
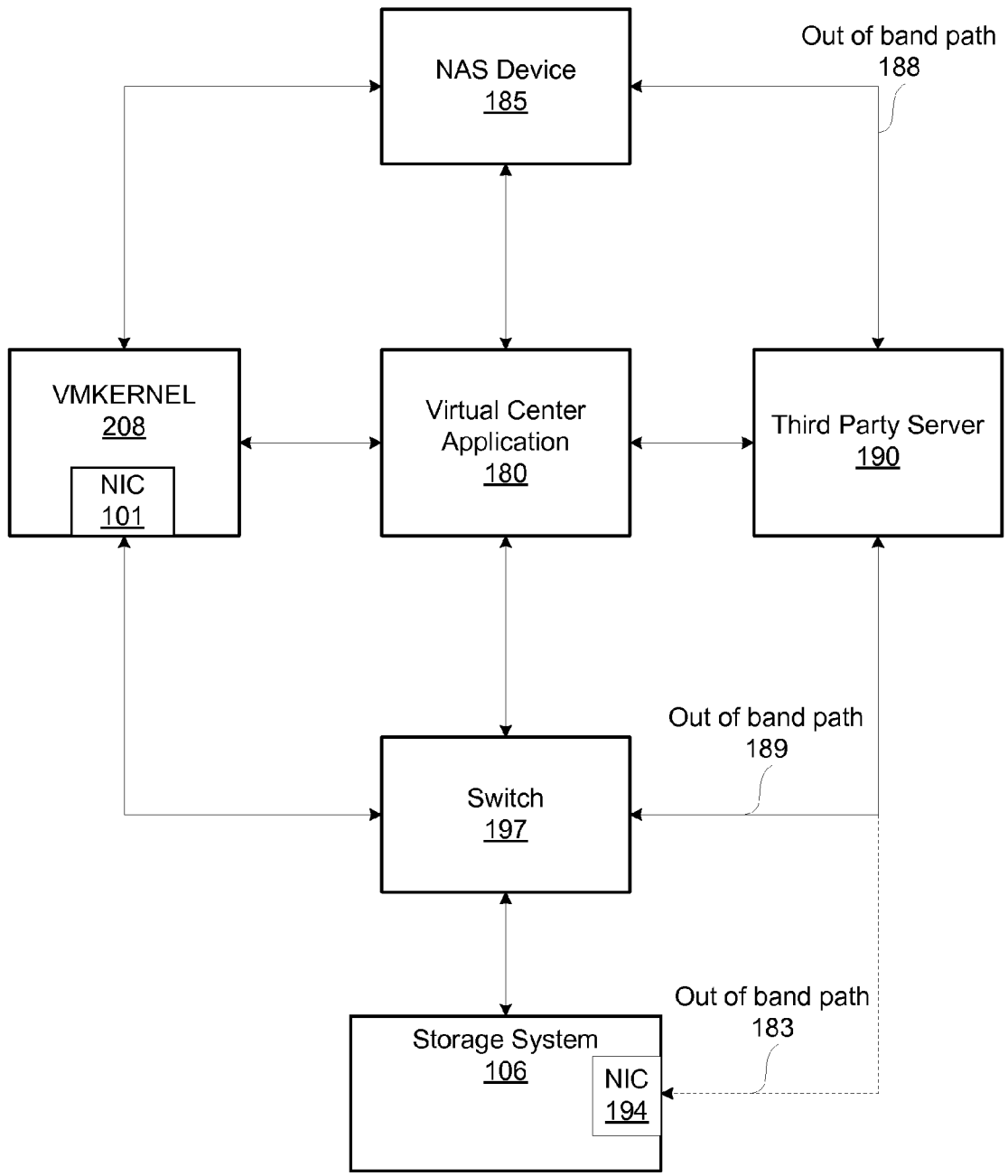
FIG. 1A is a functional block diagram of a virtualized computer system topology in which one or more embodiments of the invention may be practiced.

FIG. 1A is a functional block diagram of a virtualized computer system topology in which one or more embodiments of the invention may be practiced. A computer system may include VMKernel 208 and virtual center application 180. VMkernel 208 may be a VMware ESX Server that includes a storage stack with a virtual machine file system (VMFS) running on a server machine. In accordance with one or more such embodiments, virtual center application 180 is an application that manages one or more VMKernels 208, and runs on a server machine. As shown in FIG. 1A, virtual center application 180 is coupled between VMKernel 208 and a third party server 190 to provide out of band paths 188, 189, and 183 from VMKernel 208 to storage devices, e.g., network attached storage (NAS) device 185 and storage system 106, e.g., a disk array. As shown in FIG. 1A, switch 197 is coupled between storage system 106, virtual center application 180, VMKernel 208, and third party server 190. In accordance with one or more embodiments of the present invention, switch 197 is a switching device that contains: (a) a fast interconnect and data path processor to switch packets; and (b) some control path processors to provide I/O packet switching and fabric virtualization services.

In some embodiments, switch 197 is omitted; storage system 106 resides in a separate data center from third party server 190; and third party server 190 communicates with storage system 106 via out of band path 183 and NIC 194 (network interface card) installed in storage system 106. In accordance with one or more further embodiments, additional switches 197 and storage systems 106 may be included in a system with one or more storage systems 106 residing in different data centers.

Figure 1B:
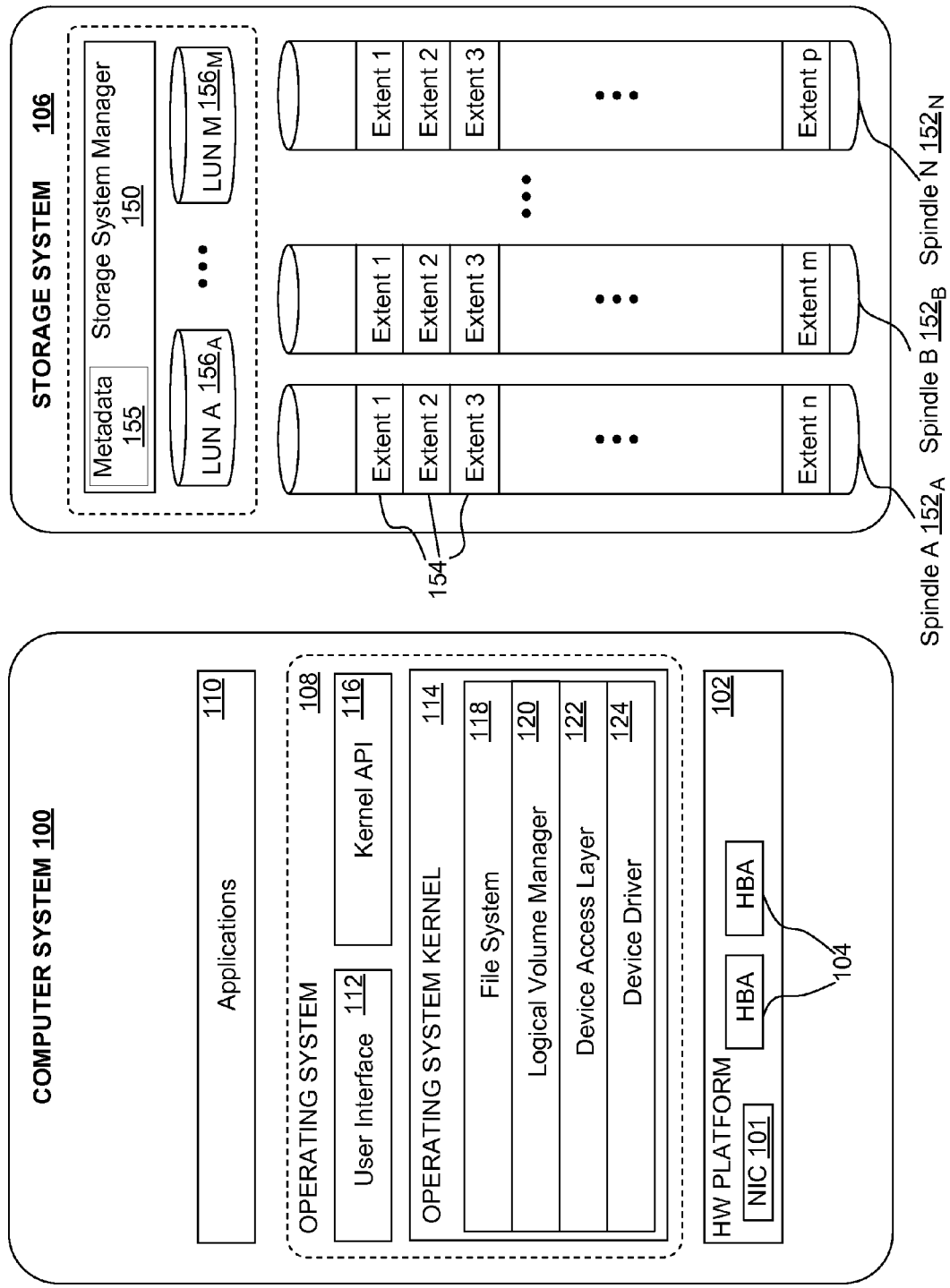
FIG. 1B is a functional block diagram of a computer system with a connected storage system in which one or more embodiments of the invention may be practiced.

FIG. 1B is a functional block diagram of a computer system with a connected storage system, in which one or more embodiments of the invention may be practiced. Computer system 100 may be constructed on a conventional, typically server-class, hardware platform 102. As shown in FIG. 1B, computer system 100 includes host bus adapters (HBA) 104 that enable computer system 100 to connect to storage system 106. Examples of storage systems 106 may be a network attached storage (NAS) device, storage area network (SAN) arrays, or any other similar disk arrays known to those with ordinary skill in the art. A storage system 106 that is an NAS device may be connected to computer system 100 through NIC 101. As further discussed below, disk arrays such as SAN arrays may typically provide block-level access to their storage through SCSI-based protocols such as Fibre Channel and iSCSI. Those with ordinary skill in the art will recognize that enterprise-level implementations of the foregoing may have multiple computer systems similar to computer system 100 that may be connected through various different known topologies and technologies (e.g., switches, etc.) to multiple storage systems 106.

In storage system 106, storage system manager 150, which represents one or more programmed storage processors, serves as a communication agent (to the outside world) for storage system 106, and implements a virtualization of physical, typically disk drive-based storage units, referred to in FIG. 1B as spindles $152_A$-$152_N$, that reside in storage system 106. Spindles $152_A$-$152_N$ are collectively referred to herein as spindles 152. From a logical perspective, each of these spindles can be thought of as a sequential array of fixed sized extents 154. Storage system manager 150 abstracts away complexities of targeting read and write operations to addresses of the actual spindles and extents of the disk drives by exposing to computer system 100 an ability to view the aggregate physical storage space provided by the disk drives as a contiguous logical storage space that may be divided into a set of virtual SCSI devices known as LUNs (Logical Units) $156_A$-$156_M$. The virtualization of spindles $152_A$-$152_N$ into such a contiguous logical storage space of LUNs $156_A$-$156_M$ can provide a more efficient utilization of the aggregate physical storage space that is represented by an address space of a logical volume. Storage system manager 150 exposes to computer system 100 an ability to transmit data transfer and control operations to storage system 106 at a LUN "block" level, where a block is a particular contiguous region in a particular LUN. For example, a LUN block may be represented as <LUN ID, offset, length> and computer system 100 may transmit to storage system 106 a read or write operation for block <LUN ID, offset, length> in the form of a SCSI operation. The LUN identifier (LUN ID) is a unique, hardware independent, SCSI protocol compliant, identifier value that is retrievable in response to a standard SCSI Inquiry command.

Storage system manager 150 maintains metadata 155 that includes a mapping (hereinafter, also referred to as an extent-mapping) for each of LUNs $156_A$-$156_M$ to an ordered list of extents, wherein each such extent can be identified as a spindle-extent pair <spindle #, extent #> and may therefore be located in any of the various spindles $152_A$-$152_N$. As such, whenever storage system manager 150 receives a LUN block operation from computer system 100, it is able to utilize the extent-map of the LUN to resolve the block into an appropriate list of extents located in various spindles $152_A$-$152_N$ upon which the operation is performed. Those with ordinary skill in the art will recognize that, while specific storage system manager implementation details and terminology may differ as between different storage device manufacturers, the desired consistent result is that the externally visible LUNs implement the expected semantics (in this example, SCSI semantics) needed to respond to and complete initiated transactions.

When storage system 106 is an NAS device, storage system manager 150 exposes to computer system 100 an ability to transmit data transfer and control operations to storage system 106 at the file level. In contrast with SAN storage, LUNs $156_A$-$156_M$ are managed within the NAS device. Storage system manager 150 manipulates files (performs I/O for files using block addresses, change file length and attributes, and the like) stored on the NAS device using file handles. When storage system manager 150 receives a file operation from computer system 100, it finds the location of the files being operated on within spindles $152_A$-$152_N$ using the filehandle specified by the file operation and performs the operation.

Returning to computer system 100, operating system 108 is installed on top of hardware platform 102 and it supports execution of applications 110. Examples of operating system 108 may be Microsoft Windows, Linux, Netware-based operating systems or any other operating system known to those with ordinary skill in the art. Users may interact with computer system 100 through a user interface 112 such as a graphical user interface or a command based shell, while executing applications 110 may access computing resources of computer system 100 that are managed by operating system kernel 114 through kernel application programming interface (API) 116. Kernel 114 provides process, memory and device management to enable various executing applications 110 to share limited resources of computer system 100.

For example, file system calls initiated by applications 110 through kernel API 116 are routed to file system 118. File system 118, in turn, converts the file system operations to LUN block operations, and provides the LUN block operations to logical volume manager 120. File system 118, in general, manages creation, use, and deletion of files stored on storage system 106 through the LUN abstraction discussed previously. Logical volume manager 120 translates the volume block operations for execution by storage system 106, and issues raw SCSI operations (or operations from any other appropriate hardware connection interface standard protocol known to those with ordinary skill in the art, including IDE, ATA, and ATAPI) to device access layer 122 based on the LUN block operations. Device access layer 122 discovers storage system 106, and applies command queuing and scheduling policies to the raw SCSI operations. Device driver 124 understands the input/output interface of HBAs 104 interfacing with storage system 106, and sends the raw SCSI operations from device access layer 122 to HBAs 104 to be forwarded to storage system 106. As previously discussed, storage system manager 150 of storage system 106 receives the raw SCSI operations (i.e., LUN block level operations), and resolves them into the appropriate extents within the spindles of the disk array that are operated upon.

Instances arise during the operation of computer system 100 where files on file system 118 cannot ultimately be stored in contiguous blocks of LUNs $156_A$-$156_M$ presented to computer system 100 by storage system 106. While there may be enough blocks of free storage space in the aggregate among various LUNs $156_A$-$156_M$ to store such files, such blocks are neither large enough nor contiguous and may be dispersed across different LUNs. In such instances, files may need to be segmented into multiple component parts at the file system level, LUN level, and the spindle-extent level (as further detailed in FIG. 3), such that the file components are stored across different blocks of different LUNs. Due to this segmentation, operations on such files, such as read and write operations, also need to be broken up into separate block level LUN operations (i.e., raw LUN block level SCSI operations) when transmitted to storage system 106 thereby increasing the resources used by computer system 100 to communicate with storage system 106 (e.g., CPU cycles, DMA buffers, SCSI commands in the HBA queue, etc.).

Figure 2:
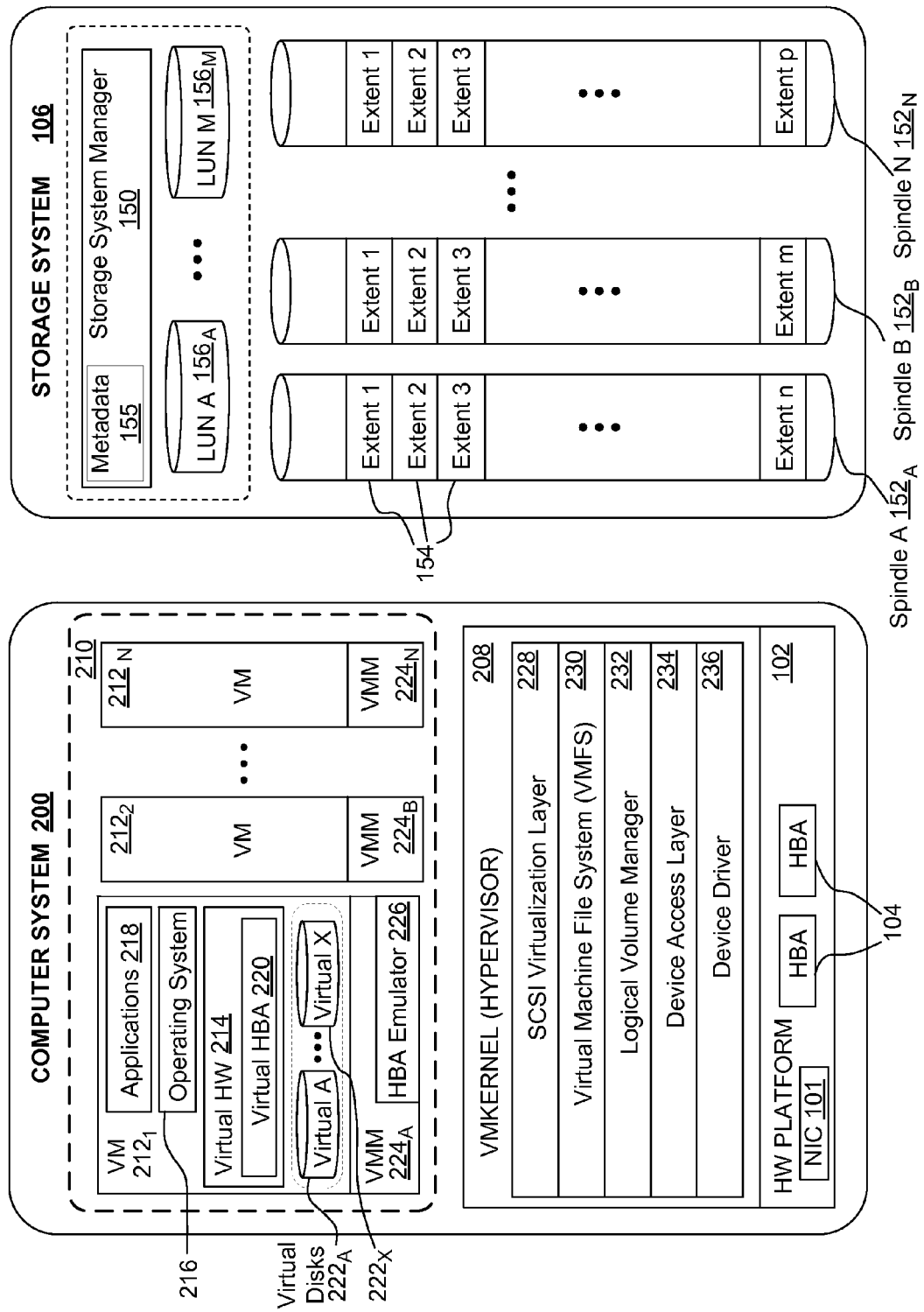
FIG. 2 is a functional block diagram of a virtualized computer system with a connected storage system in which one or more embodiments of the invention may be practiced.

One example of an environment that deals with significantly large files or collections of files where the foregoing segmentation may occur is server virtualization. As further discussed below, virtualization systems expose the concept of a "virtual disk" which is implemented as a collection of files stored on a file system. FIG. 2 is a functional block diagram of a virtualized computer system with a connected storage system, in which one or more embodiments of the invention may be practiced. Similar to computer system 100 of FIG. 1B, computer system 200 may be constructed on a conventional, typically server-class, hardware platform 102. As shown in FIG. 2, computer system 200 includes HBAs 104 and NIC 101 that enable computer system 200 to connect to storage system 106. As further shown in FIG. 2, virtual machine (VMKernel) operating system 208 is installed on top of hardware platform 102 and it supports virtual machine execution space 210 within which multiple virtual machines (VMs) $212_1$-$212_N$ may be concurrently instantiated and executed. Each such virtual machine $212_1$-$212_N$ implements a virtual hardware (HW) platform 214 that supports the installation of a guest operating system 216 which is capable of executing applications 218. Similar to operating system 108 of FIG. 1B, examples of a guest operating system 216 may be Microsoft Windows, Linux, Netware-based operating systems or any other operating system known to those with ordinary skill in the art. In each instance, guest operating system 216 includes a native file system layer (not shown), for example, either an NTFS or an ext3FS type file system layer. These file system layers interface with virtual hardware platforms 214 to access, from the perspective of guest operating systems 216, a data storage HBA, which in reality, is virtual HBA 220 implemented by virtual hardware platform 214 that provides the appearance of disk storage support (in reality, virtual disks or virtual disks $222_A$-$222_X$) to enable execution of guest operating system 216 transparent to the virtualization of the system hardware. Virtual disks $222_A$-$222_X$ may appear to support, from the perspective of guest operating system 216, the SCSI standard for connecting to the virtual machine or any other appropriate hardware connection interface standard known to those with ordinary skill in the art, including IDE, ATA, and ATAPI.

Although, from the perspective of guest operating systems 216, file system calls initiated by such guest operating systems 216 to implement file system-related data transfer and control operations appear to be routed to virtual disks $222_A$-$222_X$ for final execution, in reality, such calls are processed and passed through virtual HBA 220 to adjunct virtual machine monitor (VMM) layers $224_A$-$224_N$ that implement the virtual system support needed to coordinate operation with virtual machine kernel 208. In particular, host bus emulator 226 functionally enables the data transfer and control operations to be correctly handled by virtual machine kernel 208 which ultimately passes such operations through its various layers to true HBAs 104 or NIC 101 that connect to storage system 106. Assuming a SCSI supported virtual device implementation (although those with ordinary skill in the art will recognize the option of using other hardware interface standards), SCSI virtualization layer 228 of virtual machine kernel 208 receives a data transfer and control operation (in the form of SCSI commands) from VMM layers $224_1$-$224_N$, and converts them into file system operations that are understood by virtual machine file system (VMFS) 230. SCSI virtualization layer 228 then issues these file system operations to VMFS 230. VMFS, in turn, converts the file system operations to volume block operations, and provides the volume block operations to logical volume manager 232. Logical volume manager (LVM) 232 is typically implemented as an intermediate layer between the driver and conventional operating system file system layers, and supports volume oriented virtualization and management of the LUNs accessible through HBAs 104 and NIC 101. As previously described, multiple LUNs, such as LUNs $156_A$-$156_M$ can be gathered and managed together as a volume under the control of logical volume manager 232 for presentation to and use by VMFS 230 as an integral LUN.

VMFS 230, in general, manages creation, use, and deletion of files stored on storage system 106 through the LUN abstraction discussed previously. Clustered file systems, such as VMFS 230, are described in patent application Ser. No. 10/773,613 that is titled, "MULTIPLE CONCURRENT ACCESS TO A FILE SYSTEM" filed Feb. 4, 2004. Logical volume manager 232 issues raw SCSI operations to device access layer 234 based on the LUN block operations. Device access layer 234 discovers storage system 106, and applies command queuing and scheduling policies to the raw SCSI operations. Device driver 236 understands the input/output interface of HBAs 104 and NIC 101 interfacing with storage system 106, and sends the raw SCSI operations from device access layer 234 to HBAs 104 or NIC 101 to be forwarded to storage system 106. As previously discussed, storage system manager 150 of storage system 106 receives the raw SCSI operations (i.e., LUN block level operations) and resolves them into the appropriate extents within the spindles of the disk array that are operated upon.

Figure 3:
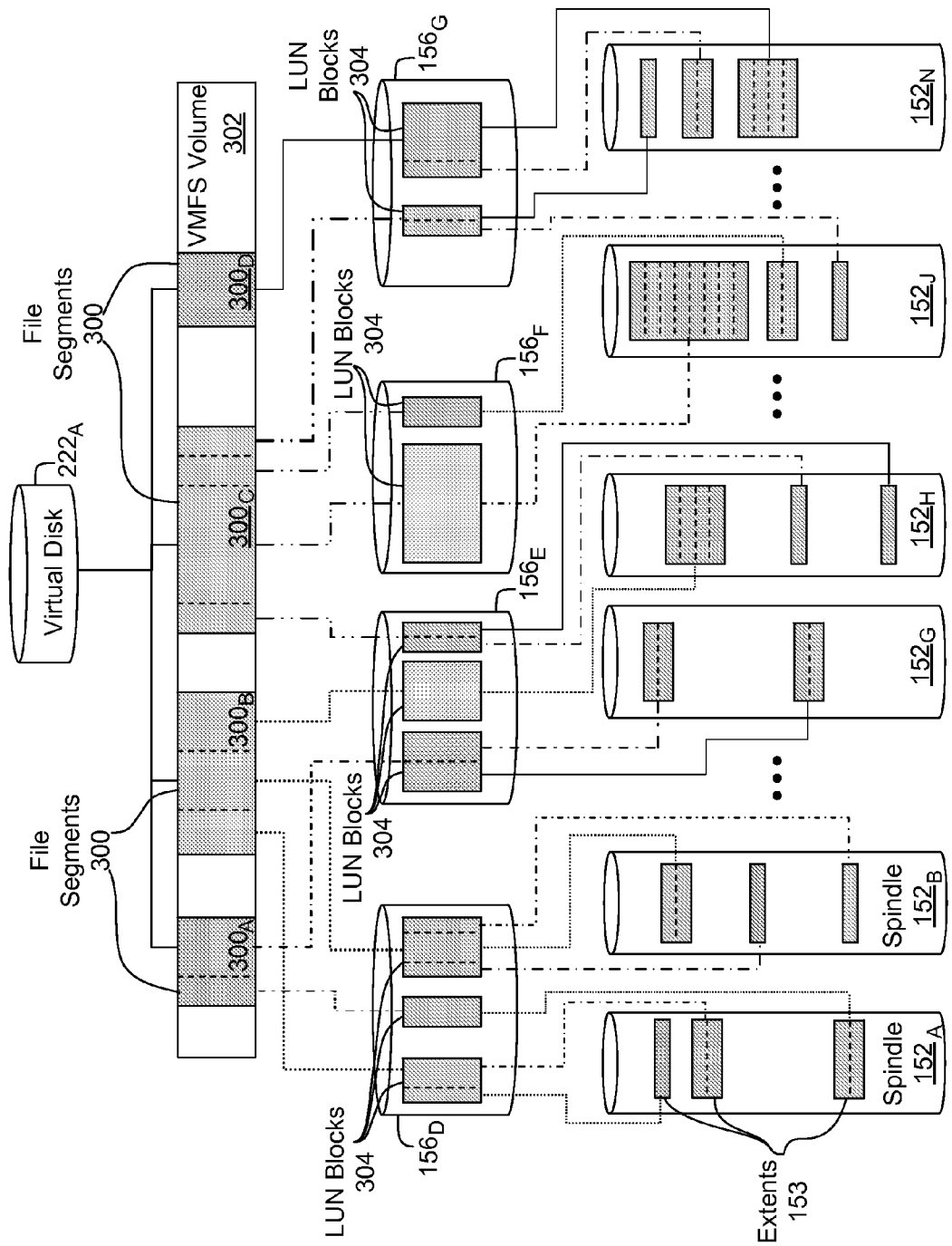
FIG. 3 is a conceptual diagram that illustrates a mapping of a file in the computer system of FIG. 2 to data storage units and physical storage locations in a disk array.

FIG. 3 is a conceptual diagram that illustrates a mapping of a file in the computer system of FIG. 2 to data storage units and physical storage locations in a disk array. As FIG. 3 depicts, virtual disk $222_A$ is stored as a file on the file system managed by VMFS 230. For simplicity, the description that follows will assume that the virtual disk is made out of a single file. However, the description is just as applicable to virtual disks containing multiple files. Further, one or more embodiments of the invention are applicable to not only one or more files but also to a file segment that is stored in non-adjacent locations of the same LUN or across different LUNs.

The virtual LUN file is allocated by VMFS 230 as a series of segments $300_A$-$300_D$ in logical address space, VMFS volume 302, that is managed by VMFS 230. Each segment $300_A$-$300_D$ is a contiguous region in VMFS volume 302, where VMFS 302 has been constructed by an administrator of the system by allocating a set of LUNs $156_D$-$156_G$ available from storage system's 106 set of LUNs $156_A$-$156_M$. As previously discussed in the context of FIGS. 1B and 2, each contiguous region of a file segment that is also contiguous on one of the allocated LUNS, is considered a LUN "block" 304 that can be represented as <LUN ID, offset, length>. As shown in FIG. 3, different LUN blocks 304 corresponding to a portion of a file segment may be of different lengths depending on how big the file segment is and what part of that file segment actually corresponds to a contiguous region of an allocated LUN. Therefore, a file may have one or more segments, and a segment may be composed of one or more blocks from one or more LUNS. In the illustrated example, file segment $300_A$ has 2 LUN blocks, file segment $300_B$ has 3 LUN blocks, file segment $300_C$ has 4 LUN blocks, and file segment $300_D$ has 1 LUN block. As shown in FIG. 3, file segments in VMFS volume 302 are converted into LUN blocks by lines connecting file segments 300 to LUN blocks 304 in LUNs 156 where LUNs 156 represent the LUN address space. When storage system 106 is a NAS device, the file segments are managed within the NAS device.

By resolving all file segments $300_A$-$300_D$ making up virtual disk $222_A$ into an ordered list of their corresponding LUN blocks (in the case of FIG. 3, for a total of 10 blocks), VMFS 230 creates a "blacklist" (e.g., a list of <LUN ID, offset, length>) which is representative of virtual disk $222_A$ in LUN block form. As previously discussed in the context of FIG. 1, storage system 106 can utilize the extent maps for LUNs $156_D$-$156_G$ to resolve each of the LUN blocks in the blocklist into its corresponding list of <spindle #, extent #> pairs (spindle-extent pairs) within spindles $152_A$-$152_N$. As shown in FIG. 3, LUN blocks 304 are converted into spindle-extent pairs by lines connecting LUN blocks 304 within LUNs 156 to extents within spindles 152. Extents 153 within spindle $152_A$ are explicitly labeled in FIG. 3. Extents within other spindles 152 are not labeled in FIG. 3. Those with ordinary skill in the art will recognize that, although FIG. 3 has been discussed in the context of a virtualized system in which a virtual disk is allocated into file segments, non-virtualized systems similar to that of FIG. 1B may also have files stored in its file system that exhibit similar types of segmentation into LUN blocks.

As previously discussed, storage devices such as storage system 106 typically expose LUN block level operations to computer systems communicating with it. For example, a standard raw SCSI read or write operation requires a LUN identifier, logical block address, and transfer length (i.e., similar to the <LUN ID, offset, length> encoding described herein). As such, in order to perform operations on files such as virtual disk $222_A$ that are managed at VMFS 230 file system level, standard raw SCSI operations need to be separately applied to each of the 10 blocks in virtual disk's $222_A$ blacklist. Each I/O communication (e.g., transmission of a raw SCSI operation) by computer system 200 with storage system 106 can take up significant computing resources such as CPU cycles, DMA buffers, and SCSI commands in an HBA queue.

By exposing LUN blocklist level primitives to the set of operations available to computer systems communicating with storage system 106, disk array vendors provide computer systems an ability to offload resource intensive communication with a disk array into the disk array itself. The disk array can then leverage any proprietary hardware optimizations that may be available internally thereto. In one embodiment, such blocklist level primitives may be embedded in a command descriptor block (CDB) in a pre-existing standard command of the communication interface protocol between the computer system and disk array or, alternatively, may be added as an additional command to the set of standard commands. For example, for SCSI supported interactions between a computer system and a disk array, certain blocklist level primitives may be able to be embedded into the CDB of SCSI's pre-existing WRITE BUFFER command, while other blacklist level primitives may require the addition of a new SCSI level command (e.g., with its own CDB) to augment SCSI's current commands. The following discussion presents three possible blacklist level primitives supported by storage system 106 (i.e., "zero" for zeroing out files, "clone" for cloning files and "delete" for deleting files). These three blacklist level primitives are in the general form: operator (source blocklist, destination blocklist, context identifier), and may be utilized to offload atomic components of larger composite virtual machine operations to the disk array. However, those with ordinary skill in the art will appreciate that other additional and alternative blacklist level primitives may be supported by the disk array without departing from the spirit and scope of the claimed invention.

Figure 4A:
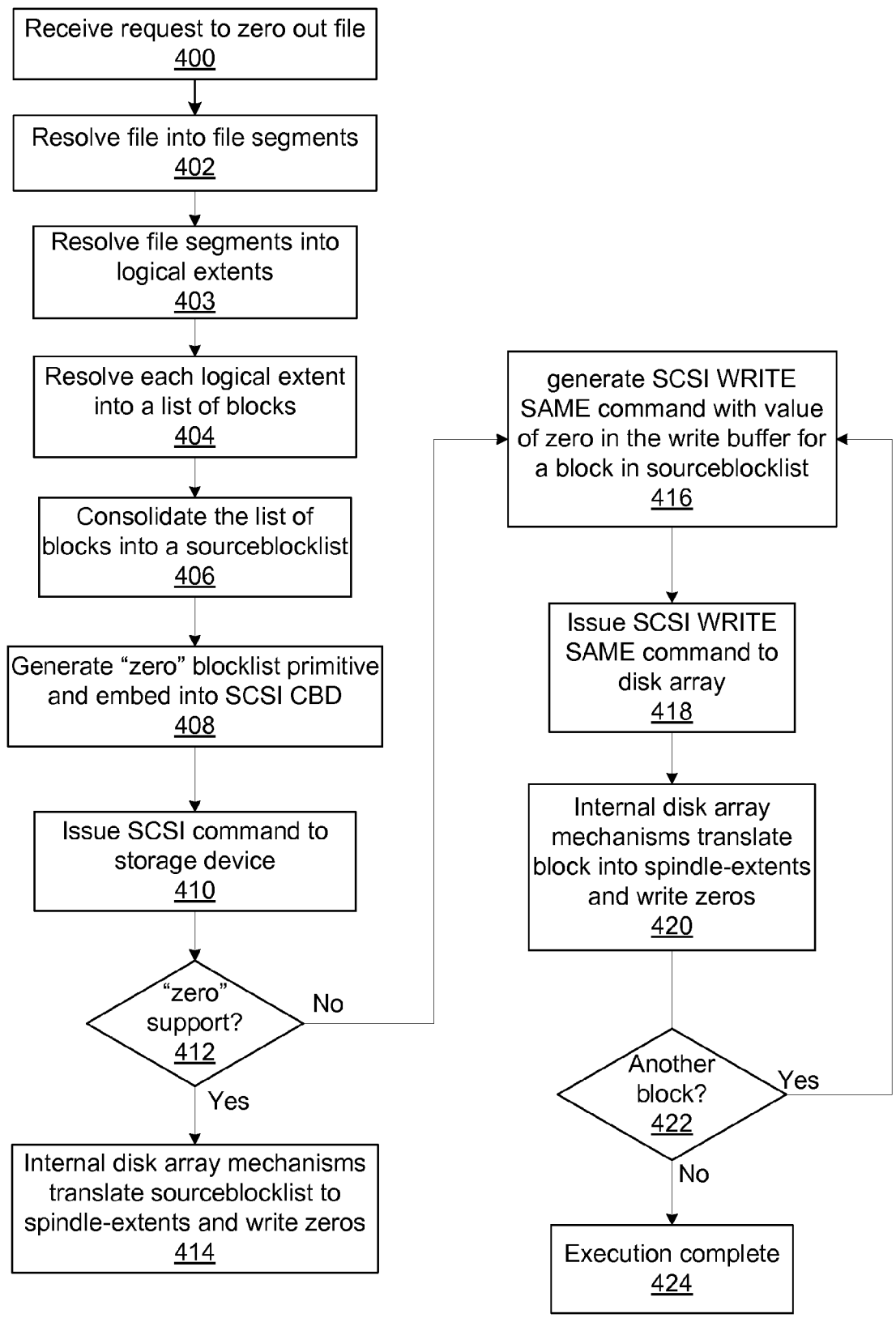
FIG. 4A is a flow diagram for zeroing a file utilizing blocklist level primitives in accordance with one or more embodiments of the invention.

FIG. 4A is a flow diagram for zeroing a file such as virtual disk $222_A$ that is stored at VMFS 320 file system level in accordance with one or more embodiments of the invention. The embodiment of FIG. 4A envisions that a SCSI based disk array supports a new blocklist level primitive called "zero" that takes a context identifier, such as virtual machine identifier (VMID), and a sourceblocklist as parameters, and can be embedded into the CBD of the standard SCSI WRITE BUFFER command. Those with ordinary skill in the art will recognize that the name of the primitive used, the number of parameters supported by the primitive, and whether the primitive is embedded in the CDB of a current SCSI command or is an articulation of a new SCSI level command are implementation choices that are available to persons skilled in the art.

At step 400, the file system within VMKernel 208 of the operating system receives a request to zero out a file. For example, in a particular embodiment that implements virtualization, VMFS 230 in VMKernel 208 may receive a request to zero out a file such as virtual disk $222_A$ (e.g., to preserve VM isolation). The file system resolves the file into its component file segments at step 402, where <fileid, offset, length>+ in step 402 represents a list of <fileid, offset, length> file segments. Fileid is a unique identifier that distinguishes segments associated with one file from segments associated with another file. At step 403, VMKernel 208 resolves the file segments into logical extents. At step 404, VMKernel 208 resolves each of the logical extents into a corresponding list of LUN blocks <LUN ID, offset, length>+. At step 406, VMKernel 208 consolidates these lists of LUN blocks into a sourceblocklist, the ordered list LUN blocks representing the relevant file. At step 408, VMKernel 208 generates a new zero blocklist primitive containing the sourceblocklist, and embeds it into the CDB of the standard SCSI command WRITE BUFFER. At step 410, VMKernel 208 issues the WRITE BUFFER command to the disk array. At decision step 412, if the disk array supports the new zero blacklist primitive, then, at step 414, internal disk array mechanisms translate the sourceblocklist to corresponding spindle-extents, and write zeroes into the extents representing the relevant file.

At decision step 412, if storage system 106 does not support the new zero blocklist primitive, then, at step 416, for each block <LUN ID, offset, length> in the sourceblocklist, VMKernel 208 generates a SCSI WRITE SAME command with the value of zero in the write buffer. At step 418, VMKernel 208 issues the WRITE SAME command to storage system 106. At step 420, storage system 106 receives the WRITE SAME command, internally translates the LUN block into the appropriate spindle-extents, and write zeroes into the extent representing the block. At decision step 422, VMKernel 208 determines if zeroes should be written for another block in the sourceblocklist and if so, steps 416, 418, and 420 are repeated to generate and issue SCSI WRITE SAME commands for another block to storage system 106. When all of the blocks have been processed, VMKernel 208 proceeds to step 424, and execution is complete. Those with ordinary skill in the art will recognize that different functional components or layers of VMKernel 208 may implement steps 400 to 410. For example, in an embodiment that implements virtualization, VMFS 230 layer of VMKernel 208 may perform steps 402 to 403 of resolving a file into segments and then into logical extents. Logical volume manager 232 may perform steps 404 to 406 of generating the LUN block operations, logical volume manager 228 of VMKernel 208 may convert the sourceblocklist into the raw SCSI WRITE BUFFER operation at step 408, and device access layer 234 of VMKernel 208 ultimately transmits the WRITE BUFFER operation at step 410 to storage system 106.

Figure 4B:
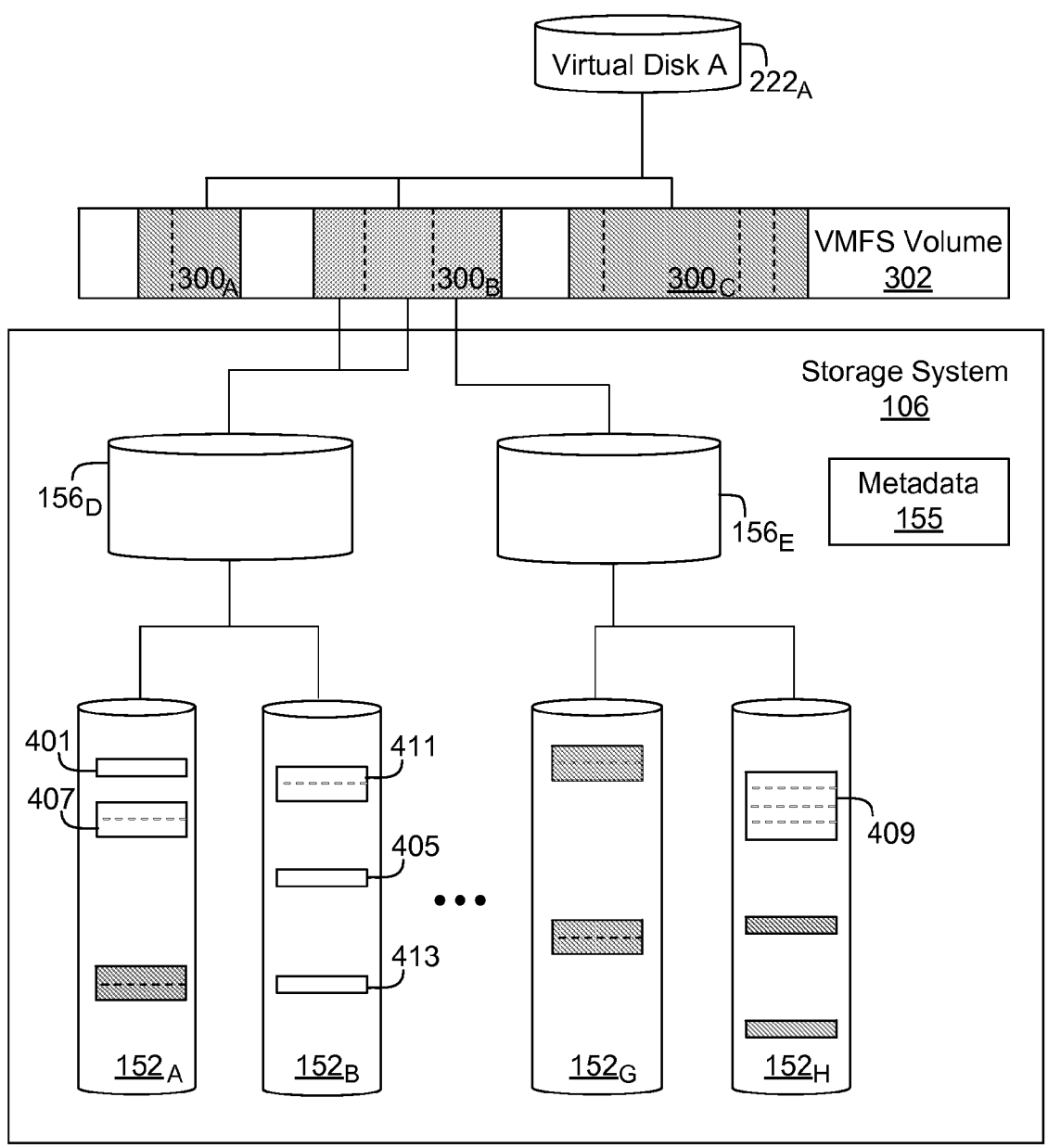
FIG. 4B is a conceptual diagram that illustrates extents in a physical storage system when a zero primitive is executed.

FIG. 4B is a conceptual diagram that illustrates extents in spindles 152 when a zero primitive is executed. When a zero primitive is executed to zero file segment $300_B$, storage system 106 zeroes the extents in spindles 152 that store file segment $300_B$. Refer to FIG. 3 for the specific mapping of LUN blocks within LUN $156_D$ and $156_E$ to spindles 152. The zero primitive may be used to initialize large portions of storage system 106 with zeroes to preserve VM isolation. In a conventional system, this initialization may require a significant amount of host resources in terms of CPU cycles, memory accesses, DMA buffers, and SCSI commands in the HBA queue. In addition to improving the efficiency of the initialization, the zero primitive may be used by storage system 106 to optimize for hardware-based thin-provisioning. In particular, storage system 106 can choose to not write zeroes on thin-provisioned LUNs when the corresponding blocks are not yet allocated. For thin-provisioning, storage system 106 may optimize by not allocating extents for zero writes, and also free up extents and mark them as zeros.

Zeroed extents 401, 405, 407, 409, 411, and 413 that correspond to segment $300_B$ within spindles $152_A$, $152_B$, and $152_H$ are shown in FIG. 4B. Metadata 155 is configured to store an extent map including the virtual LUN (assuming that each spindle extent is 64 Kbyte in size) to spindle-extent pair mapping as shown in TABLE 1, where s1, s2, and s3 may each correspond to one of spindles $152_A$-$152_N$. Although each spindle extent is shown as 64 Kbytes, other sizes may be used for the spindle extents. The zeroed extents may be unmapped from their respective extent maps by updating metadata 155. Metadata 155 is updated to indicate that those extents are zeroed (without necessarily writing zeroes) and proprietary mechanisms may be employed to lazily zero out requested extents using a background process, even for non-thin-provisioned LUNs. For example, a flag in metadata 155 for each spindle extent corresponding to segment $300_B$, where the flag indicates that the extent should effectively be presented as zeroes to the user. Techniques for performing lazy zeroing are described in patent application Ser. No. 12/050,805 that is titled, "INITIALIZING FILE DATA BLOCKS" filed Mar. 18, 2008. Metadata related to the zero primitive may also be stored as well as configuration information that is described in detail in conjunction with FIGS. 8A, 8B, 8C, 9A, and 9B.

TABLE 1

| Extent Map | | |
|---|---|---|
| LUN offset (Kbyte) | <spindle, extent> | Metadata/configuration information |
| 0 | <s2, e3> | Zeroed, thin-provisioned |
| 64 | <s1, e1> | Clone of <s2, e1> |
| 128 | <s3, e1> | Zeroed, thin-provisioned |
| 192 | <s2, e3> | free |
| ... | ... | ... |

Figure 5A:
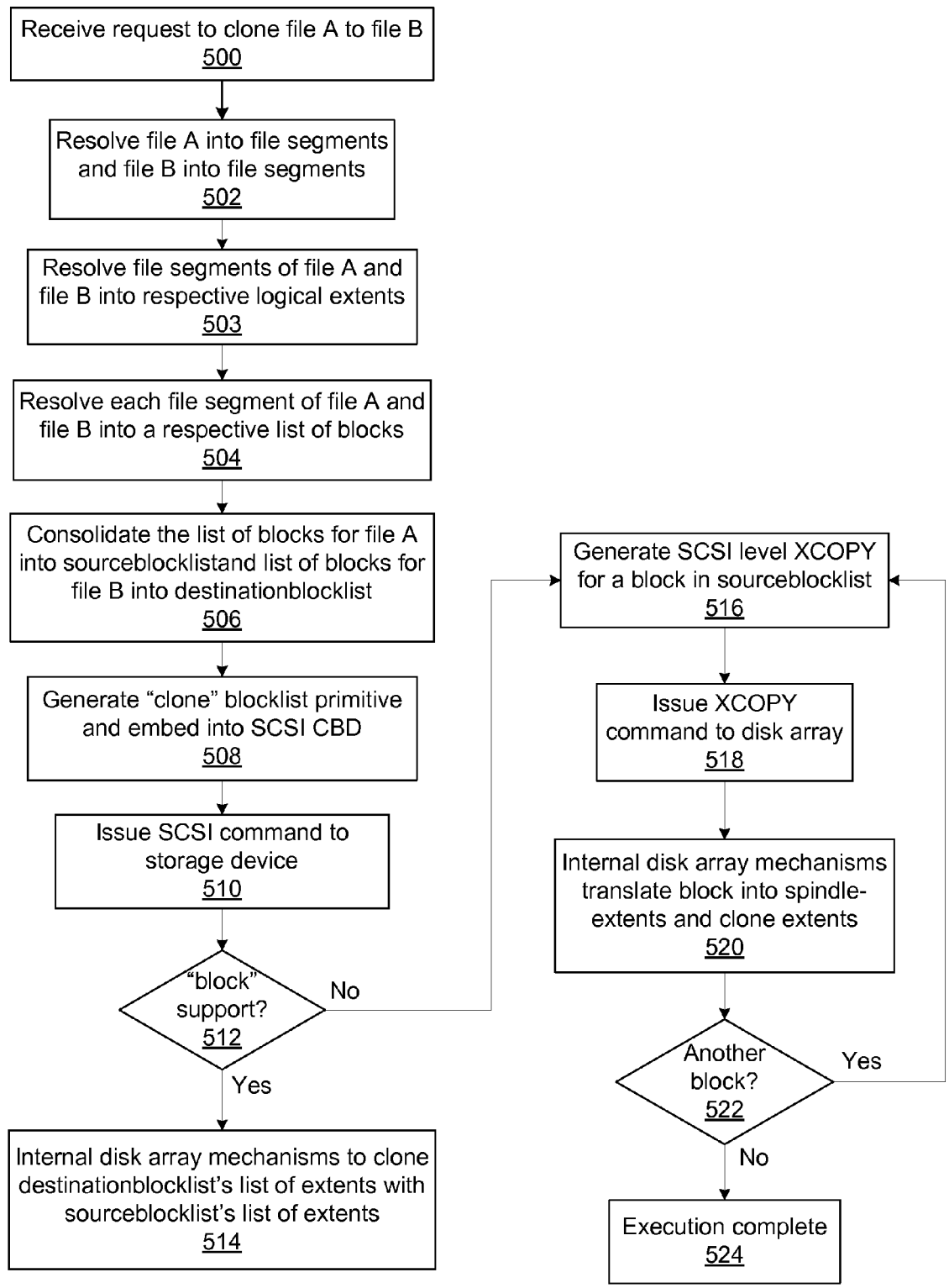
FIG. 5A is a flow diagram for cloning a file utilizing blocklist level primitives in accordance with one or more embodiments of the invention.

FIG. 5A is a flow diagram for cloning a file such as virtual disk $222_A$ that is stored at VMFS 320 file system level and has been segmented at such level into different LUN blocks in accordance with one or more embodiments of the invention. At step 500, the file system within the kernel of the operating system may receive a request to copy or clone one file A to another file B. At step 502, the file system resolves file A and file B into their component file segments, e.g., a list of <fileid, offset, length> file segments. At step 503, VMFS 230 resolves the file segments into logical extents.

At step 504, logical volume manager 232 resolves each of the logical extents for each of file A and file B into their corresponding lists of LUN blocks <LUN ID, offset, length>+. At step 506, logical volume manager 232 consolidates these lists of LUN blocks into a sourceblocklist and a destinationblocklist for file A and file B, respectively, which are the ordered list LUN blocks representing the respective files. At step 508, VMKernel 208 generates the new clone blocklist primitive containing the sourceblocklist and destinationblocklist, and embeds it into the CDB of the standard SCSI command WRITE BUFFER. At step 510, VMKernel 208 issues the SCSI command to storage system 106. At decision step 512, if storage system 106 supports the new clone blacklist primitive, then, at step 514, internal disk array mechanisms clone the destinationblocklist's list of extents with sourceblocklist's list of extents (including utilizing any hardware optimizations within storage system 106 such as "copy-on-write" techniques).

If, however, at decision step 512, storage system 106 does not support the new clone blacklist primitive, then, at step 516, for each block <LUN ID, offset, length> in the sourceblocklist, VMKernel 208 generates a SCSI XCOPY command with the <LUN ID, offset, length> of the destinationblocklist. At step 518, VMKernel 508 issues the SCSI XCOPY command to storage system 106. At step 520, storage system 106 receives the XCOPY command, internally translates the LUN block into the appropriate spindle-extents, and copies the source extent into the destination extent representing the block. At decision step 522, VMKernel 208 determines if more blocks in sourceblocklist remain to be cloned and if so, steps 516 and 518 are repeated to generate and issue SCSI XCOPY commands for another block to storage system 106. When all of the blocks have been processed the clone operation is complete. Those with ordinary skill in the art will recognize that different functional components or layers of VMKernel 208 may implement steps 500 to 510. For example, in an embodiment that implements virtualization, VMFS 230 layer of VMKernel 208 may perform steps 502-503 of generating the LUN block operations, logical volume manager 228 of VMKernel 208 may create the sourceblocklist and destinationblocklist at steps 504-506 and convert it into the raw SCSI XCOPY operation at step 508, and device access layer 234 of VMKernel 208 ultimately transmits the XCOPY operation at step 510 to storage system 106.

Figure 5B:
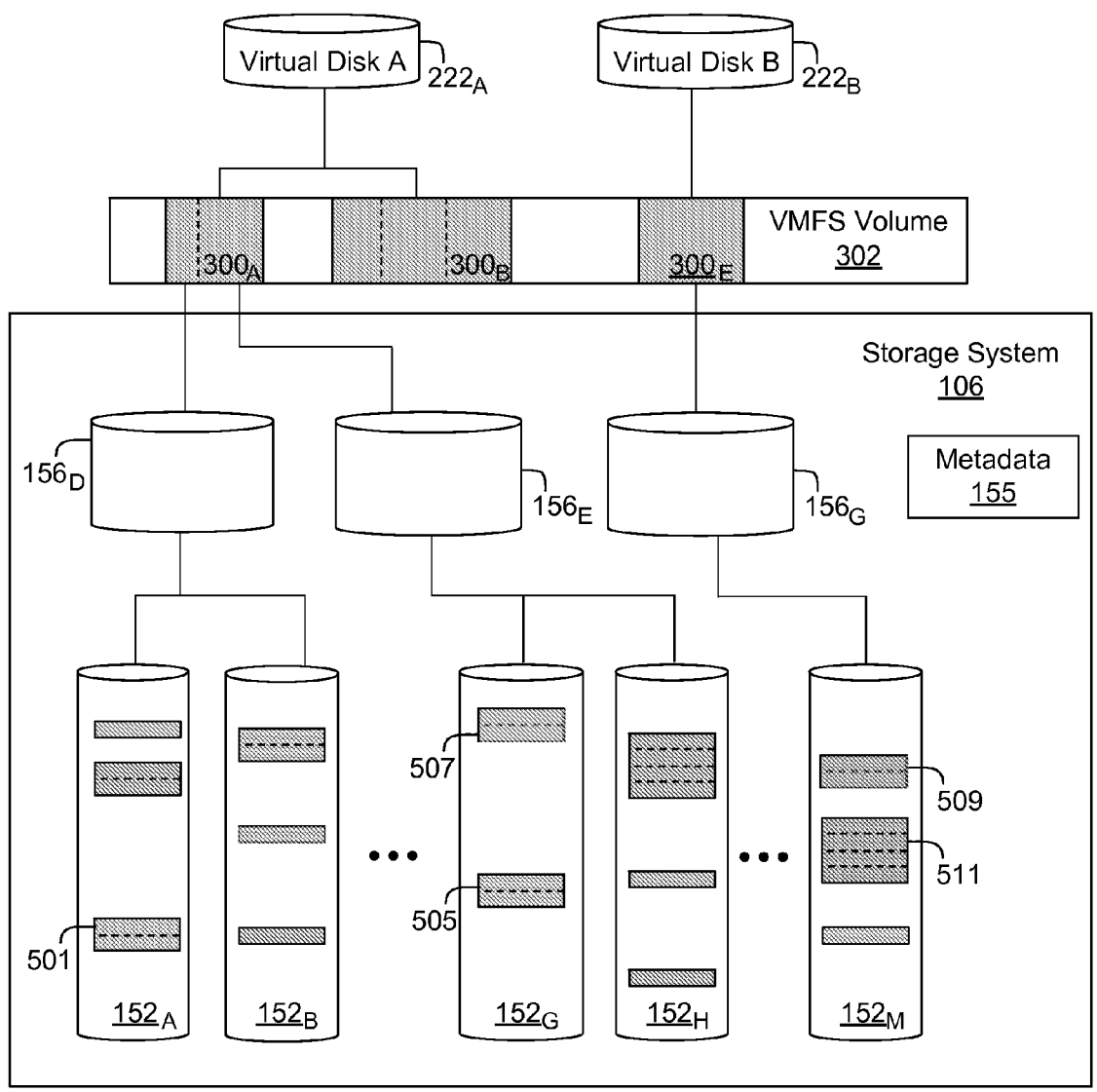
FIG. 5B is a conceptual diagram that illustrates extents in a physical storage system when a clone primitive is executed.

FIG. 5B is a conceptual diagram that illustrates extents in spindles 152 when a clone primitive is executed. When a clone primitive is executed to clone file segment $300_A$ of virtual disk $222_A$ to a file segment $300_E$ of a virtual disk $222_B$, storage system 106 copies extents 501, 505, and 507 in spindles $152_A$ and $152_G$ that store file segment $300_A$ to extents 509 and 511 in spindle $152_M$ that store file segment $300_E$ Refer to FIG. 3 for the specific mapping of LUN blocks within LUN $156_D$, $156_E$, and $156_G$ to spindles 152. In a conventional system, cloning may require a significant amount of host resources in terms CPU cycles, memory accesses, DMA buffers, and SCSI commands in an HBA queue. The files being cloned may be multiple gigabytes in size, causing the clone operation to last for many minutes or even hours. In addition to improving the efficiency of the initialization, the clone primitive may be used by storage system 106 to use proprietary mechanisms, e.g., metadata 155, to mark cloned destination extents as duplicates of source extents. For example, extents 509 may be unmapped by storage system 106 in the extent map of metadata 155, and extents 505 may be substituted in a read-only format.

Figure 6A:
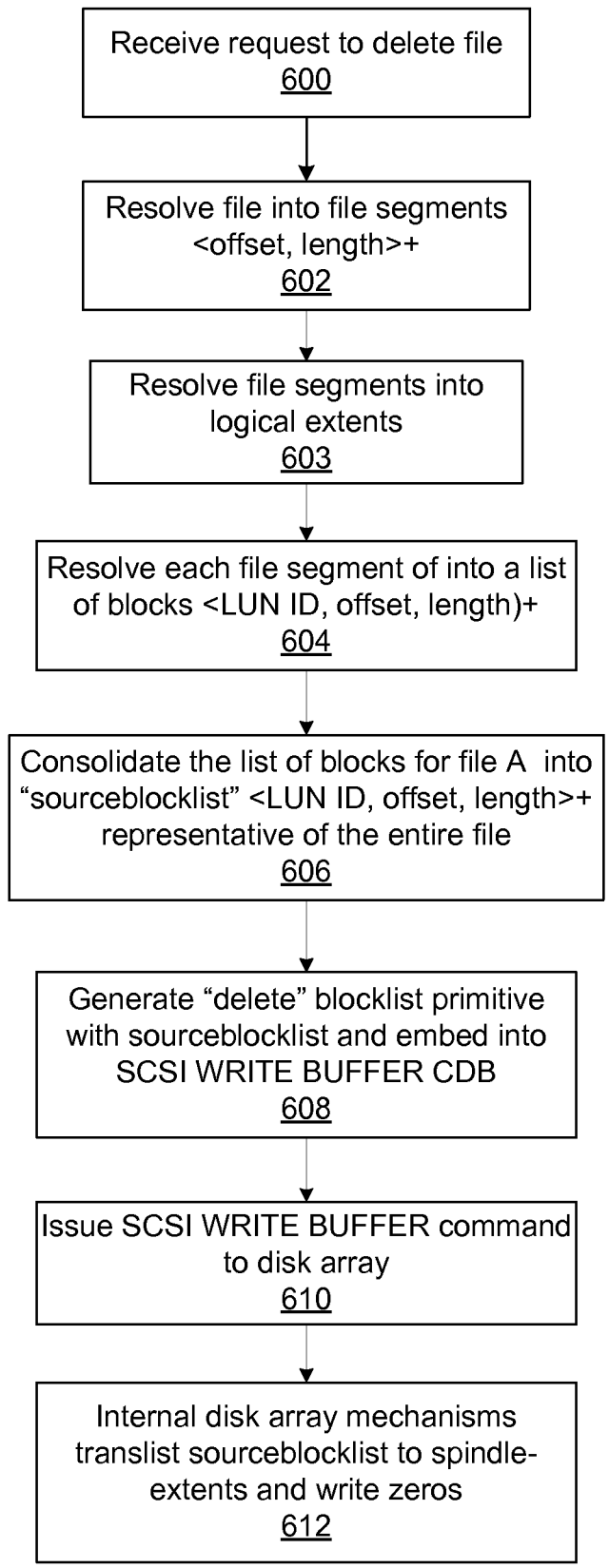
FIG. 6A is a flow diagram for deleting a file utilizing blacklist level primitives in accordance with one or more embodiments of the invention.

FIG. 6A is a flow diagram for deleting a file, such as virtual disk $222_A$ that is stored at VMFS 230 file system level, in accordance with one or more embodiments of the invention. Conventionally, when files are deleted from a file system, the space may be reclaimed in the logical address space of the volume, but LUN block liveness is not necessarily conveyed to the disk array. While file system block allocation may be implicitly signaled to a disk array through the first writes to a previously unwritten region, file system block deallocation cannot be implicitly signaled to the disk array in a similar fashion. As such, a disk array cannot provide disk management optimization techniques for tasks such as thin-provisioning, de-duplication, mirroring and replication by exploiting extents related to deleted files only known at the computer system's file system level.

Similar to the "zero" primitive embodiment of FIG. 4A, the embodiment of FIG. 6A envisions that a SCSI based disk array supports a new blacklist level primitive called "delete" that takes a context identifier, such as virtual machine identifier (VMID), and a sourceblocklist as parameters, and can be embedded into the CBD of the standard SCSI WRITE BUFFER command. At step 600, the file system within the kernel of the operating system receives a request to delete a file. For example, in a particular embodiment that implements virtualization, VMFS 230 in VMKernel 208 may receive a request to delete a file such as virtual disk $222_A$. At step 602, the file system resolves the file into its component file segments. At step 603, VMFS 230 resolves the file segments into logical extents, and at step 604, logical volume manager 232 resolves each of the file segments into their corresponding list of LUN blocks <LUN ID, offset, length>+. At step 606, logical volume manager 232 consolidates these lists of LUN blocks into a sourceblocklist, the ordered list LUN blocks representing the relevant file. At step 608, VMKernel 208 generates the new delete blocklist primitive containing the sourceblocklist, and embeds it into the CDB of the standard SCSI command WRITE BUFFER. At step 610, VMKernel 208 issues the WRITE BUFFER command to the disk array. At step 612, the internal disk array mechanisms are able to translate the sourceblocklist to corresponding spindle-extents and mark them as deleted or update metadata 155 to indicate that the extents should be returned to the free pool.

Figure 6B:
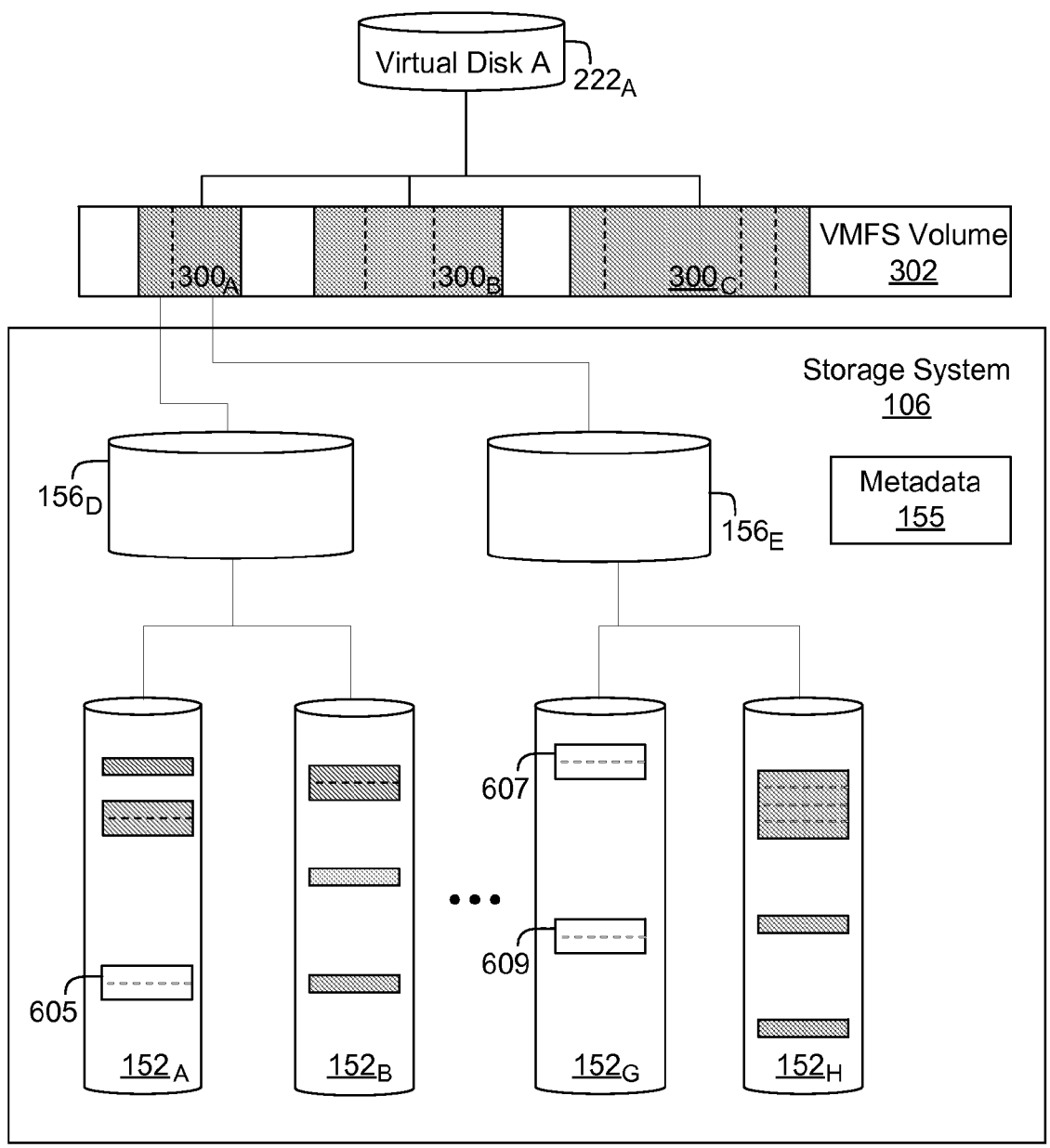
FIG. 6B is a conceptual diagram that illustrates extents in a physical storage system when a delete primitive is executed.

FIG. 6B is a conceptual diagram that illustrates extents in spindles 152 when a delete primitive is executed. Refer to FIG. 3 for the specific mapping of LUN blocks within LUN $156_D$ and $156_E$ to spindles 152. When a file is deleted from a VMFS volume on hardware thin-provisioned virtual disk A $222_A$ that corresponds to segment $300_A$ and extents 605, 607, and 609 in storage system 106, storage system 106 can unmap the deleted extents from the extent map stored in metadata 155, and return them to the free pool. Internal optimization techniques such as unmapping of deleted extents may be employed by storage system 106 for tasks such as thin-provisioning, de-duplication, mirroring and replication. Further, the unmapped regions of the LUN address space can point to a proprietary representation, e.g., a zero-extent representation. In the absence of the delete primitive, thin-provisioned LUNs would needlessly use three extents (in lieu of extents 605, 607, and 609) from the storage pool that would not be available for use by the file system until the next time that part of the file system address space is allocated to a file.

By exposing file administrative level operations such as zero, clone, and delete to the set of file operations available to computer systems communicating with a NAS based storage device, storage vendors provide computer systems an ability to offload resource intensive communication with the file storage into the NAS device itself, which can then leverage any proprietary hardware optimizations that may be available internally to the NAS device. In one embodiment, file level primitives may be accessed as (I/O control) commands using a pre-existing standard command of the communication interface protocol between the computer system and NAS device or, alternatively, may be added as an additional commands to the set of standard commands. The following discussion presents three possible file level primitives supported by a NAS based storage system 106 (i.e., "zero" for zeroing out files, "clone" for cloning files and "delete" for deleting files). These three file level primitives may be utilized to offload atomic components of larger composite virtual machine operations to the storage system. However, those with ordinary skill in the art will appreciate that other additional and alternative blocklist level primitives may be supported by the storage system 106 without departing from the spirit and scope of the claimed invention.

Figure 7A:
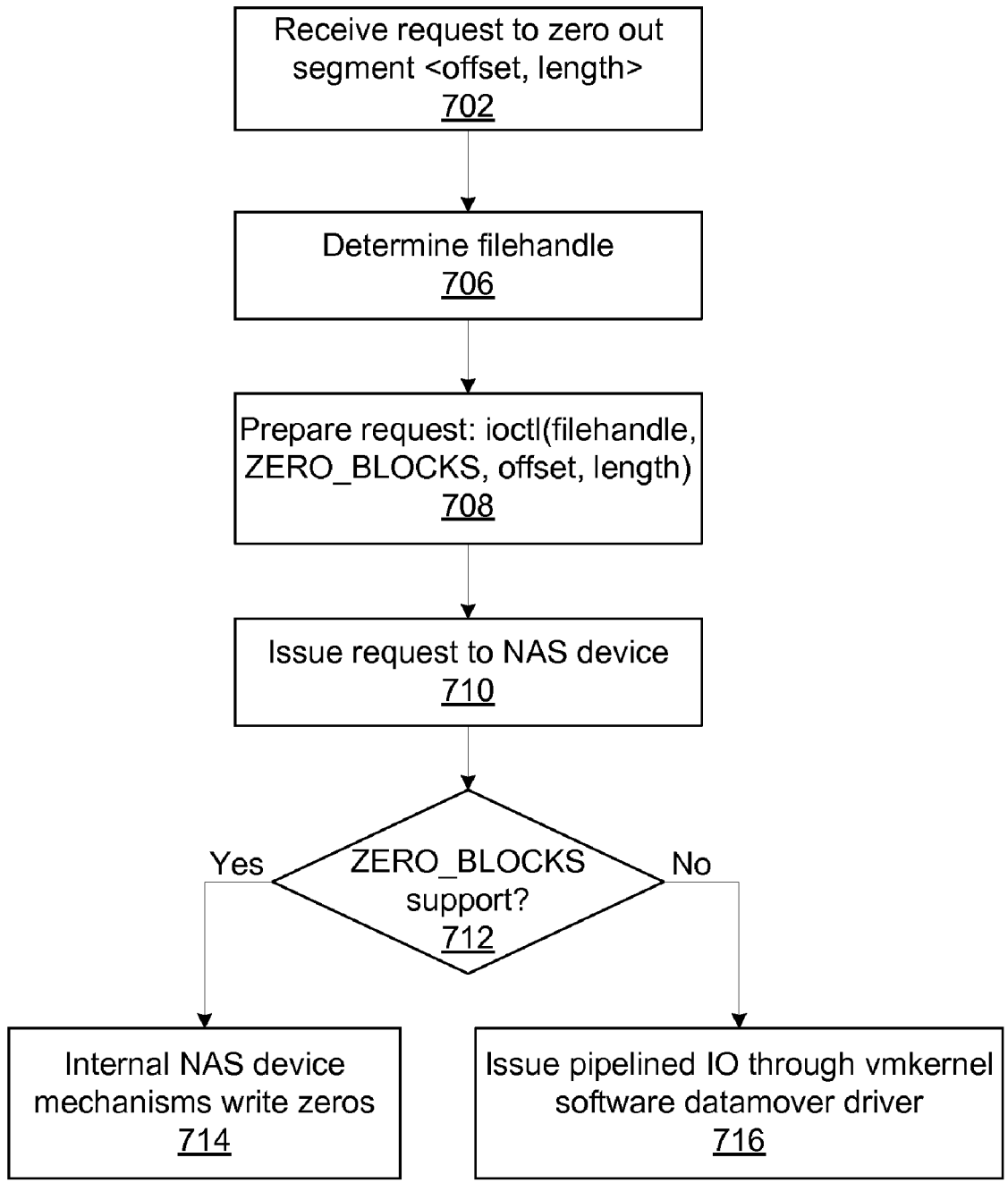
FIG. 7A is a flow diagram for zeroing a file stored in an NAS (network attached storage) device utilizing file level primitives in accordance with one or more embodiments of the invention.

FIG. 7A is a flow diagram for zeroing a file stored in an NAS device utilizing file level primitives in accordance with one or more embodiments of the invention. The embodiment of FIG. 7A envisions that a NAS device supports a new file level primitive called ZERO_BLOCKS that takes an open NFS/CIFS handle of a source file (filehandle), offset, and a length as parameters, and can be issued as an ioctl command. Those with ordinary skill in the art will recognize that the name of the primitive used, and the number of parameters supported by the primitive are implementation choices that are available to persons skilled in the art. At step 702, VMFS 230 within VMKernel 208 receives a request to zero out a file segment specified by a fileid, an offset and length. At step 706 VMKernel 208 determines the filehandle for the source file. At step 708, VMKernel 208 prepares the ZERO_BLOCKS ioctl command, and at step 710, VMKernel 208 issues the ioctl command to the NAS device. If, at decision step 712, the NAS device supports the new ZERO_BLOCKS, then, at step 714, internal NAS device mechanisms are able to write zeroes to corresponding spindle-extents and write zeroes into the extents representing the relevant file. Otherwise, at step 716, VMKernel 208 issues pipelined I/O through a datamover driver to write zeroes using conventional mechanisms.

Those with ordinary skill in the art will recognize that different functional components or layers of the kernel may implement steps 702 to 710. Conventional NAS devices may be configured to write zeroes to blocks to perform administrative operations, however that functionality is not available to users of the NAS device, such as VMs 212. Without the ZERO_BLOCKS command VMs 212 transfer zeroes to the NAS device to write zeroes to the blocks corresponding to a file. In some cases, for example when a two terabyte virtual disk is used, as many as two terabytes of zeroes are transferred to the NAS device compared with transferring 20 bytes of parameters using the ZERO_BLOCKS command in order to offload the storage operation from computer system 200 to the NAS device, e.g., storage system 106. Additionally, any administrative optimizations that are provided by the NAS device may also be leveraged through the ZERO_BLOCKS command. For example, particular NAS devices may be configured to not store zeroes at the time of the command is received.

Figure 7B:
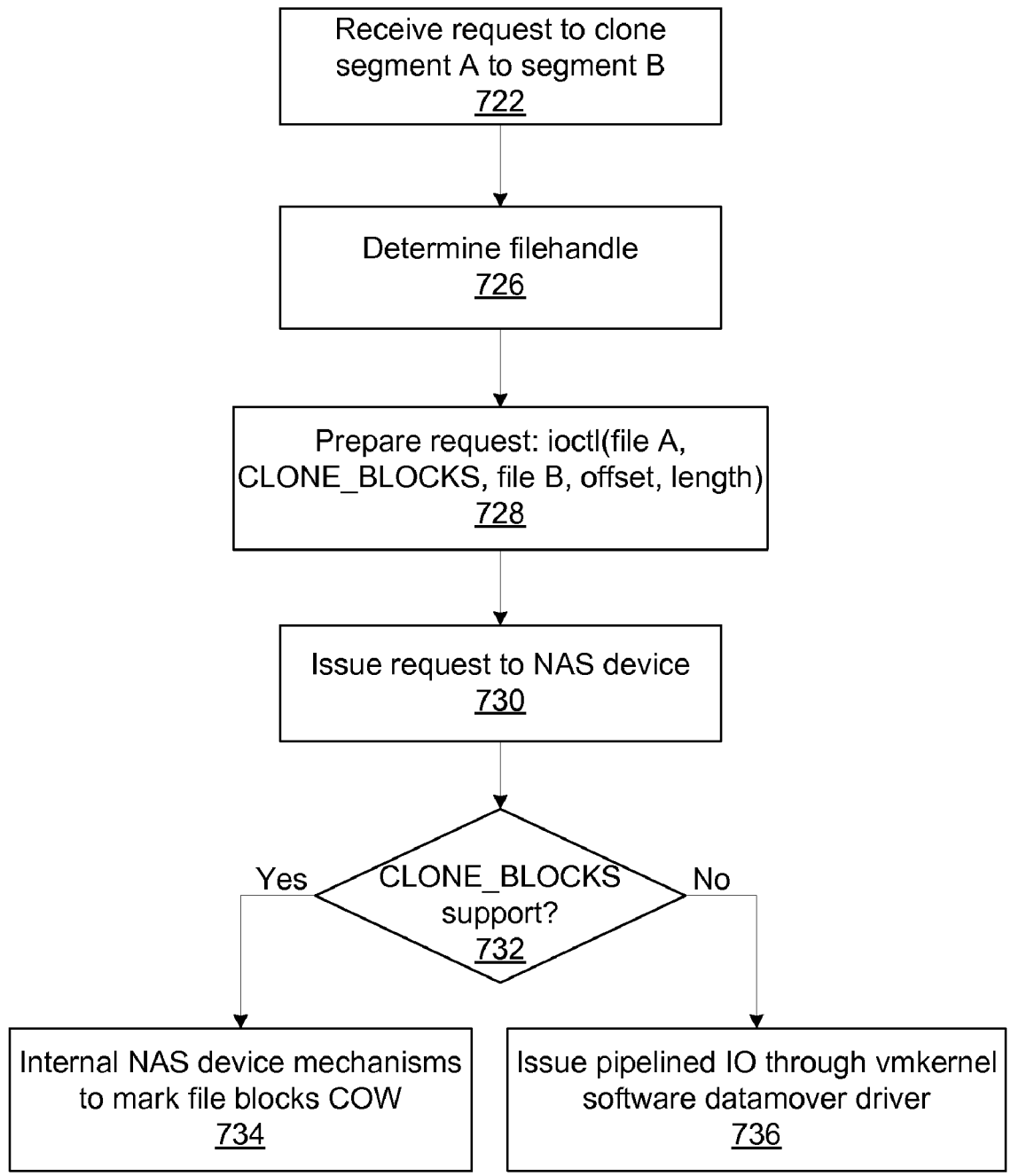
FIG. 7B is a flow diagram for cloning a file stored in a NAS device utilizing file level primitives in accordance with one or more embodiments of the invention.

FIG. 7B is a flow diagram for cloning a file stored in a NAS device utilizing file level primitives in accordance with one or more embodiments of the invention. The embodiment of FIG. 7B envisions that a NAS device supports a new file level primitive called CLONE_BLOCKS that takes open NFS/CIFS handles of a source file and a destination file, offset, and a length as parameters, and can be issued as an ioctl command. Those with ordinary skill in the art will recognize that the name of the primitive used and the number of parameters supported by the primitive are implementation choices that are available to persons skilled in the art. At step 722, VMFS 230 within VMKernel 208 receives a request to clone file segment A to segment B, where each segment is specified by a fileid, an offset and length. At step 726, VMKernel 208 determines the filehandle for file A. At step 728, VMKernel 208 prepares the CLONE_BLOCKS ioctl command, and at step 730, VMKernel 208 issues the ioctl command to the NAS device. If, at decision step 732, the NAS device supports the new CLONE_BLOCKS, then, at step 734, internal disk array mechanisms are able to copy corresponding spindle-extents of file segment A into the extents representing file segment B (including utilizing any hardware optimizations supported by the NAS device for administrative operations such as "copy-on-write" techniques). Otherwise, at step 736, VMKernel 208 issues I/O through a datamover driver to copy the file using conventional mechanisms.

Figure 7C:
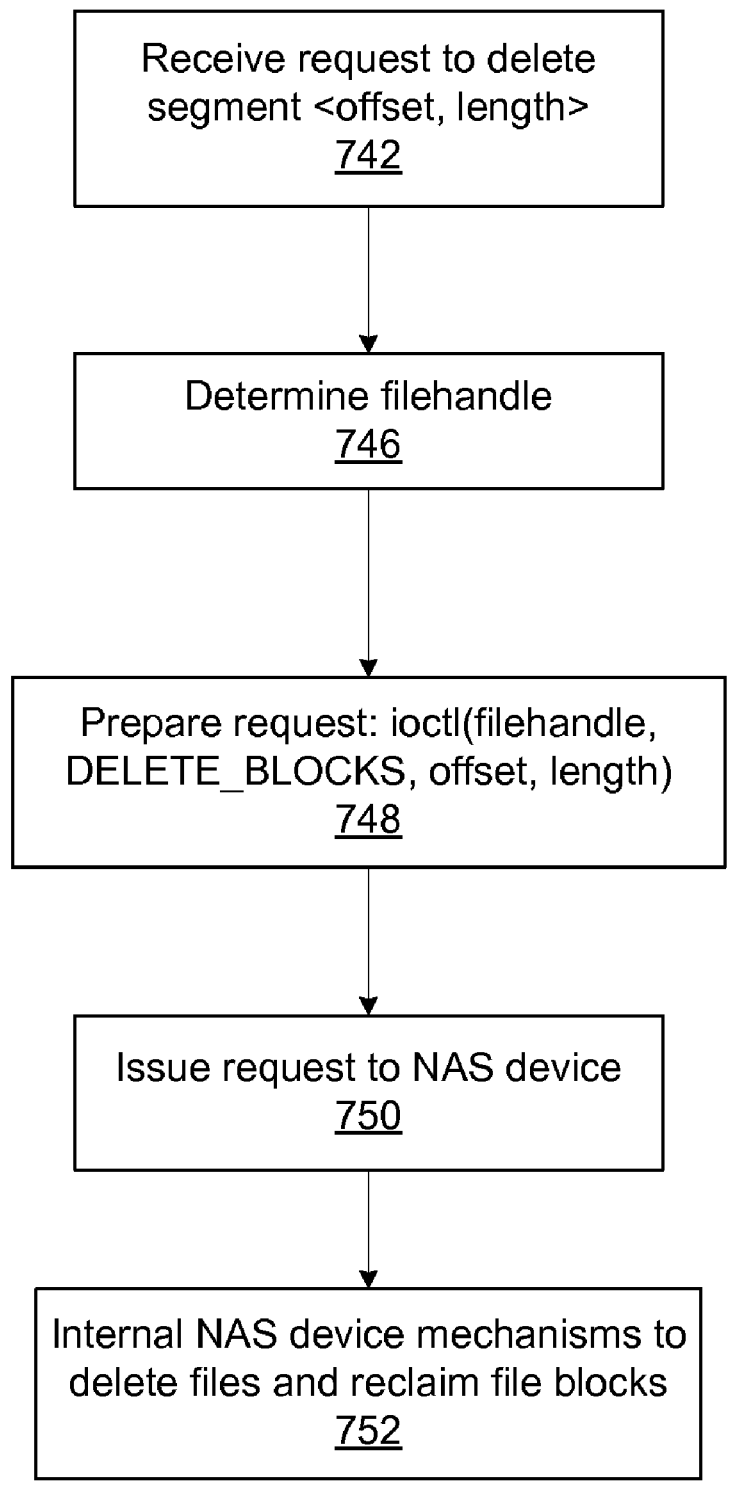
FIG. 7C is a flow diagram for deleting a file stored in a NAS device utilizing file level primitives in accordance with one or more embodiments of the invention.

FIG. 7C is a flow diagram for deleting a file segment stored in a NAS device utilizing file level primitives in accordance with one or more embodiments of the invention. When files are deleted from a file system, the space may be reclaimed in the logical address space volume, and a file delete operation is executed by the storage system manager on the NAS device. In a conventional system, when an application frees a subset of a file, for example if a guest OS inside of a VM deletes a few files inside of its file system, the NAS device will not be aware that the blocks used to store the subset of the file can be deallocated. When the delete primitive is used, the deletion initiated by the guest OS will translate into a deletion of file segment(s), which is then conveyed to the NAS device through the DELETE_BLOCKS primitive. When the new primitive are used, a NAS device can provide disk management optimization techniques for tasks such as thin-provisioning, de-duplication, mirroring and replication by exploiting extents related to deleted files only known at the computer system's file system level.

Similar to the ZERO_BLOCKS and CLONE_BLOCKS primitives, the embodiment of FIG. 7C envisions that a NAS device supports a new file level primitive DELETE_BLOCKS that takes a filehandle, offset, and a length as parameters and can be issued as an ioctl command. Those with ordinary skill in the art will recognize that the name of the primitive used and the number of parameters supported by the primitive are implementation choices that are available to persons skilled in the art. At step 742, VMFS 230 within VMKernel 208 receives a request to delete a segment specified by a fileid, an offset and length. At step 746, VMKernel 208 determines the filehandle for the file. At step 748, VMKernel 208 prepares the DELETE_BLOCKS ioctl command, and at step 750, VMKernel 208 issues the ioctl command to the NAS device. At step 752, internal disk array mechanisms are able to delete corresponding spindle-extents of the file and keep track of such extents as being freed by the file system such that they may be utilized in internal optimization techniques for tasks such as thin-provisioning, de-duplication, mirroring and replication. For example, in an embodiment where LUNs may be thin-provisioned, deletion of a file segment through the foregoing "delete" blocklist primitive enables the NAS device to unmap the extents associated with the file segment from the extent-maps of their associated thin-provisioned LUNs, thereby returning the unmapped extents to the free pool of extents.

Those with ordinary skill in the art will recognize that the foregoing discussions as well as FIGS. 4A, 4B, 5A, 5B, 6A, 6B, 7A, 7B and 7C are merely exemplary and that alternative blocklist and file level primitives may be implemented without departing from the spirit and scope of the claimed invention. Furthermore, while this discussion has focused upon transmitting blacklist level primitives where the blacklist is representative of an entire file on the file system, those with ordinary skill in the art will recognize that alternative embodiments may work with smaller blacklists, such as blocklists at the file segment level. For example, in the case of zeroing out virtual disk $222_A$ in FIG. 3, an alternative file segment blocklist level embodiment would require 4 instances of issuing the zero blocklist primitive to storage system 106 (i.e., one for each of the file segments $300_A$-$300_D$) in comparison to a single instance of the zero blocklist primitive containing a blocklist comprising a consolidation of the 4 smaller blacklists for the 4 file segments $300_A$-$300_D$.

The primitives discussed above can be used to build hardware-assisted data protection (e.g., snapshotting, cloning, mirroring and replication) and other file management commands that operate at the file level and leverage the disk array's internal capabilities. A snapshot of a virtual disk is a copy of the virtual disk as it existed at a given point in time (i.e. a previous version of a virtual disk). A virtualized system such as FIG. 2, may use the zero primitive of FIGS. 4A, 4B, 5A, 5B, 6A, 6B, 7A, 7B and 7C for (a) cloning operations for eager-zeroed virtual disks, (b) initializing new file blocks in thin-provisioned virtual disks, (c) initializing previously unwritten blocks for zeroed virtual disks, and (d) integrating thin-provisioned and zeroed virtual disk formats with the disk array's hardware-based thin-provisioning. Similarly, embedding blacklists within the XCOPY primitive as depicted in FIG. 5A and the CLONE_BLOCKS file primitive of FIG. 7B may be utilized for (a) instant provisioning of virtual disks and (b) snapshotting of virtual disks. The delete primitive of FIGS. 6 and 7C may be used for (a) destroying or reformatting files on a space optimized (thin-provisioned or de-duplicated) or protected (mirrored, replicated or snapshotted) volume, (b) deleting virtual disks or virtual disks snapshots on a space optimized or protected volume, and (c) integrating thin-provisioned and zeroed thick virtual disk formats with the disk array's hardware-based thin-provisioning.

For example, using blocklist with the XCOPY SCSI operation as discussed in FIGS. 5A and 5B or the CLONE_BLOCKS command as discussed in FIG. 7B enables a virtualized system to provide instant provisioning of virtual disks in the order of a few milliseconds or seconds in comparison to a few minutes or hours without the combined use of blacklists and WRITE_BUFFER or XCOPY. Instant provisioning involves making a full copy of a template virtual disk during the process of creating or provisioning a new virtual machine within a computer system. Because virtual disks are represented as significantly large files on the file system, performing continual standard SCSI READ and WRITE operations at a LUN block level, including use of read and write buffers within the computer system, takes up significant time and resources. By converting the files into blacklists and utilizing the WRITE_BUFFER or XCOPY SCSI command, the effort to perform the cloning can be offloaded to the hardware of the storage system itself.

Similarly, the delete primitive of FIGS. 6A, 6B, and 7C facilitates the management of thinly provisioned virtual disks within a virtualized system. Rather than allocating storage space for a virtual disk in anticipation of future needs, a thin-provisioned virtual disk is allocated the minimum amount of storage space for its current needs and dynamically provided additional space from a pool of free space when the virtual disk demands it. As discussed in the context of FIGS. 6A, 6B, and 7C, because the delete blocklist primitive or DELETE_BLOCKS command frees extents in a storage system and enables the storage system controller to unmap such freed extents from the extent-maps of the LUNs previously using those extents, these extents can be returned to the free pool of extents utilized by other thinly provisioned virtual disks in need of additional storage space.

The detailed description provided herein with reference to FIG. 2 relates to a virtualized computer system. However, those of ordinary skill in the art will recognize that even non-virtualized computer systems may benefit from such blacklist level primitives—any files existing at the file system level (i.e., not necessarily representative of virtual LUNs) of any computer system may take advantage of such blocklist level primitives. Similarly, while the foregoing discussion has utilized the SCSI interface as a primary example of protocol communication between the disk array and computer system, those with ordinary skill in the art will also appreciate that other communication protocols may be utilized without departing from the spirit and scope of the claimed invention. In particular, as described in conjunction with FIGS. 7A, 7B, and 7C, a NAS device that provides file level access to storage through protocols such as NFS (in contrast to a SAN disk array supporting SCSI), rather than embedding blacklist primitives into the CDB of pre-existing SCSI commands, may use functional file primitives may be developed as ioctl control functions for NFS's standard ioctl operation.

Offloading Storage Operations to a Third Party Server

Figure 8A:
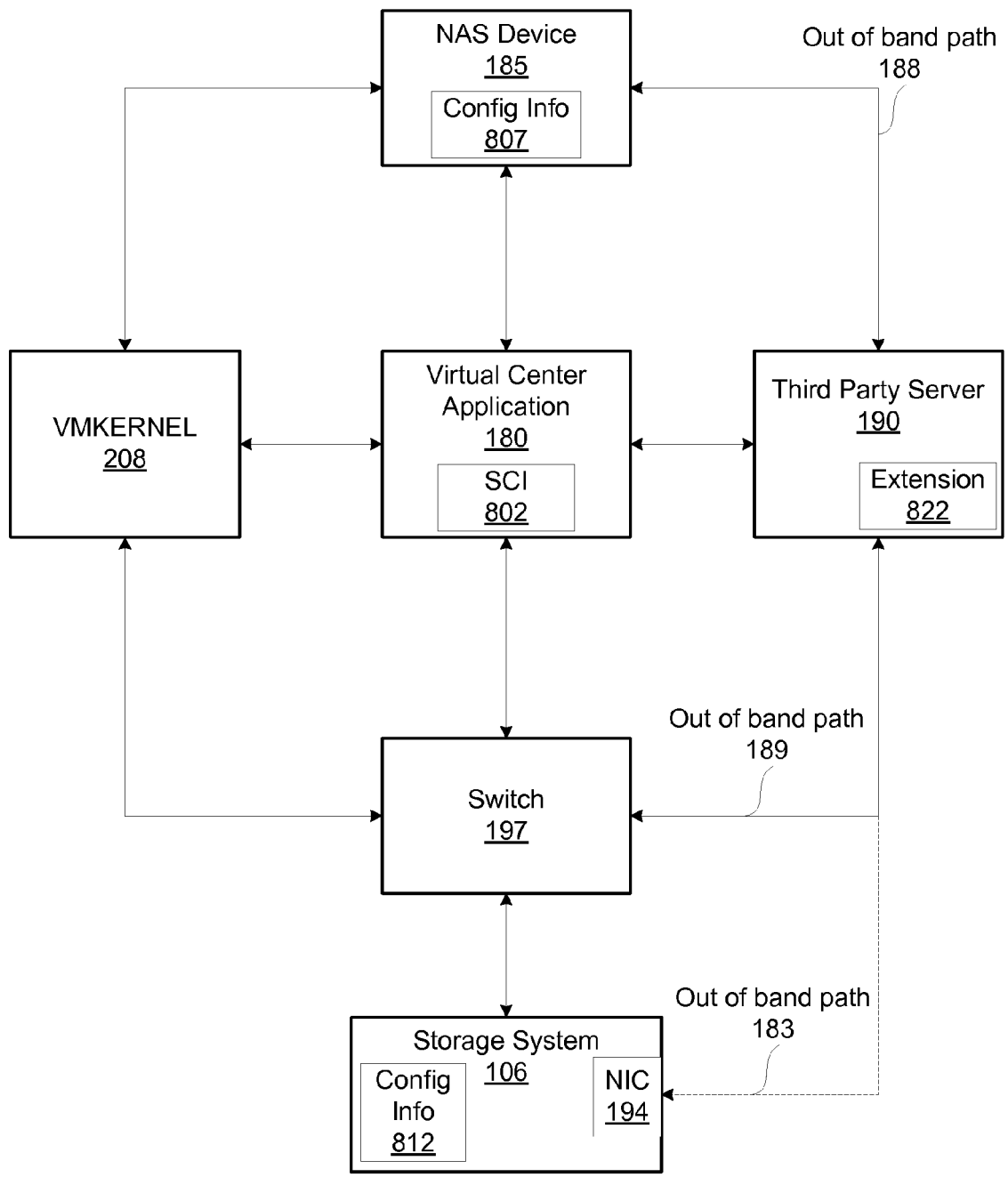
FIG. 8A is another functional block diagram of a virtualized computer system topology in which one or more embodiments of the invention may be practiced.

FIG. 8A is another functional block diagram of a virtualized computer system topology in which one or more embodiments of the invention may be practiced. As previously described in conjunction with FIG. 1A, a computer system may include VMKernel 208 and virtual center application 180. In accordance with one or more embodiments of the invention, virtual center application 180 stores VM specific storage metadata keyed by context identifiers in supplemental configuration information (SCI) 802. SCI 802 can be queried and edited by clients by referencing the context identifier through a user interface. Third party server 190 is a server machine that also stores VM specific storage metadata (attributes and policies) keyed by context identifiers, and includes vendor specific extension 822 or a plugin that is used to manage VM storage operations. Virtual center application 180 may use SNIA (Storage Networking Industry Association) compliant profiles (or vendor specific APIs) to communicate with third party server 190 in order to centrally report and set storage metadata for VMs 212. Extension 822 translates VM specific storage metadata into configuration information 812 that is used to update metadata for storage system 106. Extension 822 may also be configured to translate VM specific storage metadata into configuration information 807 that is used to update metadata for NAS device 185. Configuration information 812 may be stored as part of metadata 155, and contains information needed to update metatdata 155 to enable the storage devices to carry out the specified storage operation. For example, extension 822 generates configuration information 812 or 807 for updating metadata 155 to enable storage devices to carry out composite storage operations such as mirroring and replication, as described in conjunction with FIGS. 8B and 8C.

When hardware based storage operations are to be carried out on VM components, such as virtual disks, the context of such operations is conveyed as configuration information 812 or 807 to storage system 106 or NAS device 185, respectively, through third party server 190. For example, when setting up a hardware-thin-provisioned virtual disk for VM 212 (refer to FIG. 2), storage system 106 is instructed to map a context identifier associated with the virtual disk to metadata indicating that VM 212 is thin-provisioned, storing the thin-provisioning attribute in configuration information 812. Extension 822 receives SCI 802 for composite storage operations and generates configuration information that is supplied to storage system 106 so that storage system 106 will recognize that files associated with the context identifier are thin-provisioned. Previously unwritten extents corresponding to VM 212 can be unmapped in the background or at creation time. Furthermore, zero writes coming into storage system 106 as zero operations can be silently discarded by storage system 106. Without configuration information 812 or 807, storage system 106 or NAS device 185 would be unaware that VM 212 is thin-provisioned.

Basic operations such as open, close, delete, and the like that do not require the movement of data are performed by VMKernel 208. The data moving portion of the storage operations, such as copying, are offloaded from VMKernel 208 to the storage system 106 under control of third party server 190 using vendor specific extension 822 or a plugin, as described in conjunction with FIGS. 8B and 8C. Additionally, primitives such as zero, clone, and delete can each convey the context identifier as part of their payload, so that an operation can be instantaneously mapped to the properties that govern the context requesting the operation. Furthermore, the primitives can also carry per-operation directives. For example, a primitive may include a directive to make a full clone (eagerly copy blocks) for a given set of file segments instead of a quick clone (copy-on-write blocks).

Figure 8B:
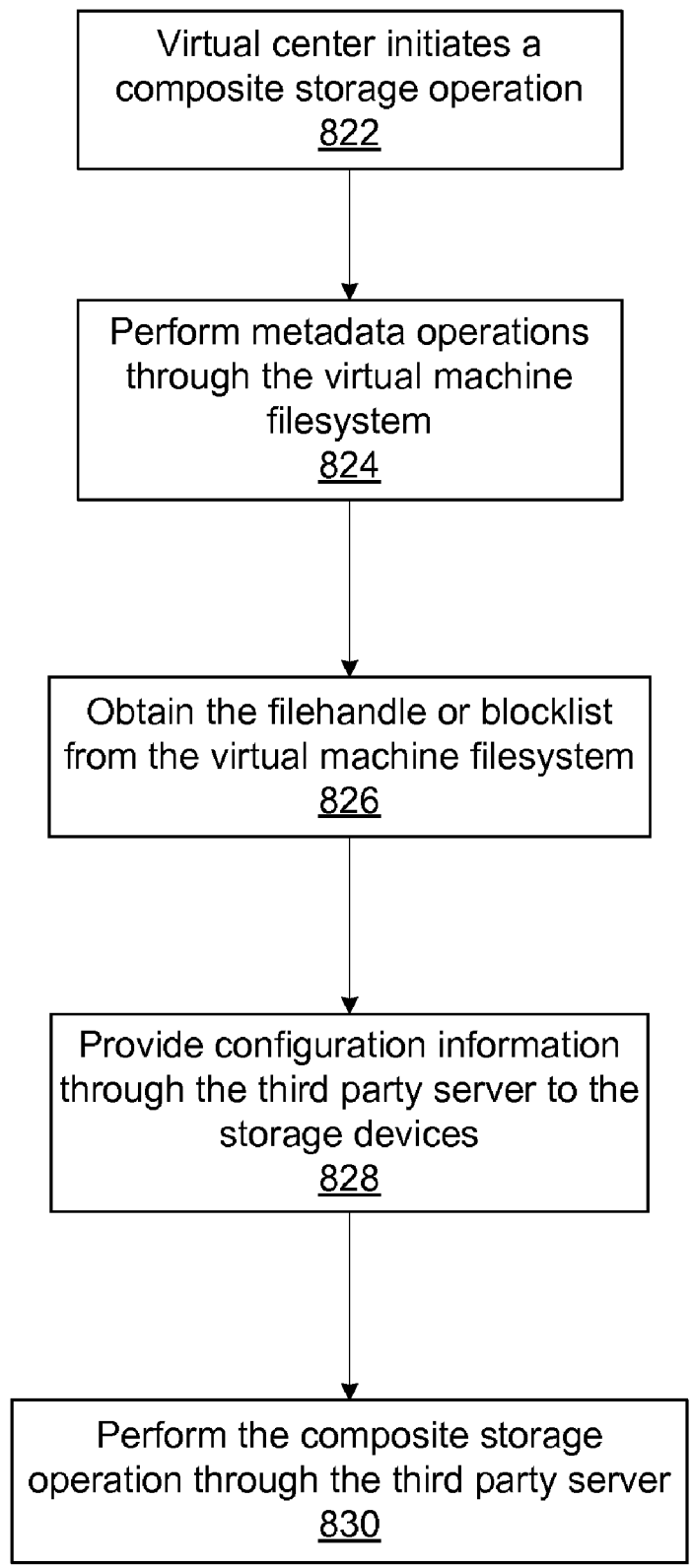
FIG. 8B is a flow diagram for offloading composite storage operations to a third party server in accordance with one or more embodiments of the invention.

FIG. 8B is a flow diagram for offloading composite storage operations, such as mirroring and replication using third party server 190 in accordance with one or more embodiments of the invention. At step 822 a user initiates a composite storage operation through virtual center application 180 or a command line. At step 824, virtual center application 180 performs metadata operations on VMFS volume 302 through VMKernel 208. For example, when a replicate composite operation is specified, a second set of virtual disks in a different data center is set up by virtual center application 180. When a "mirror" composite storage operation is performed, virtual center application 180 sets up a second set of virtual disks in the same data center. At step 826, VMKernel 208, in conjunction with virtual center application 180, obtains location information, such as a filehandle (for files stored on NAS device 185) or blocklist (for files stored on storage system 106), from VMKernel 208, and updates SCI 802 with the operation specific configuration information, e.g., that a virtual disk is a copy (mirrored or replicated) of another virtual disk.

At step 828, third party server 190 receives operation specific configuration information that is included in SCI 802 from VMKernel 208. Third party server 190 transcribes the operation specific configuration information into a vendor specific format to generate configuration information 807 or 812 that is needed for the composite storage operation, and supplies it to the storage device, e.g., NAS device 185 or storage system 106, through out-of-band paths 188 and 183, respectively. Alternatively, the operation specific configuration information may be transcribed by the storage device to produce configuration information 807 or 812. The configuration information may be included in the extent-map.

When mirroring is performed, the configuration information indicates that a relationship exists between the file being mirrored and the mirror file, and may indicate whether or not the mirroring is synchronous or asynchronous and a quality of service (QOS) level. Similarly, with replication, the configuration information may indicate whether compression or encryption should be employed. The configuration information is used by the storage device to keep the mirror file updated as the file being mirrored is modified, e.g., written to, snapshotted, rolled back, and the like. Writes to the file being mirrored (or replicated) will be reflected to the mirrored (or replicated) file by storage system 106 or NAS device 185 based on the configuration information 812 or 807, respectively. Writes for replicated extents are reflected by storage system 106 to a storage system 106 in another data center. Importantly, the transfer of data is performed by the storage system rather than third party server 190, virtual center application 180, or VMKernel 208.

At step 830, third party server 190 controls the execution of the composite storage operation by the storage device in order to offload storage operations from VMKernel 208. For example, third party server 190 issues a command to mirror or replicate the file by creating a clone.

Figure 8C:
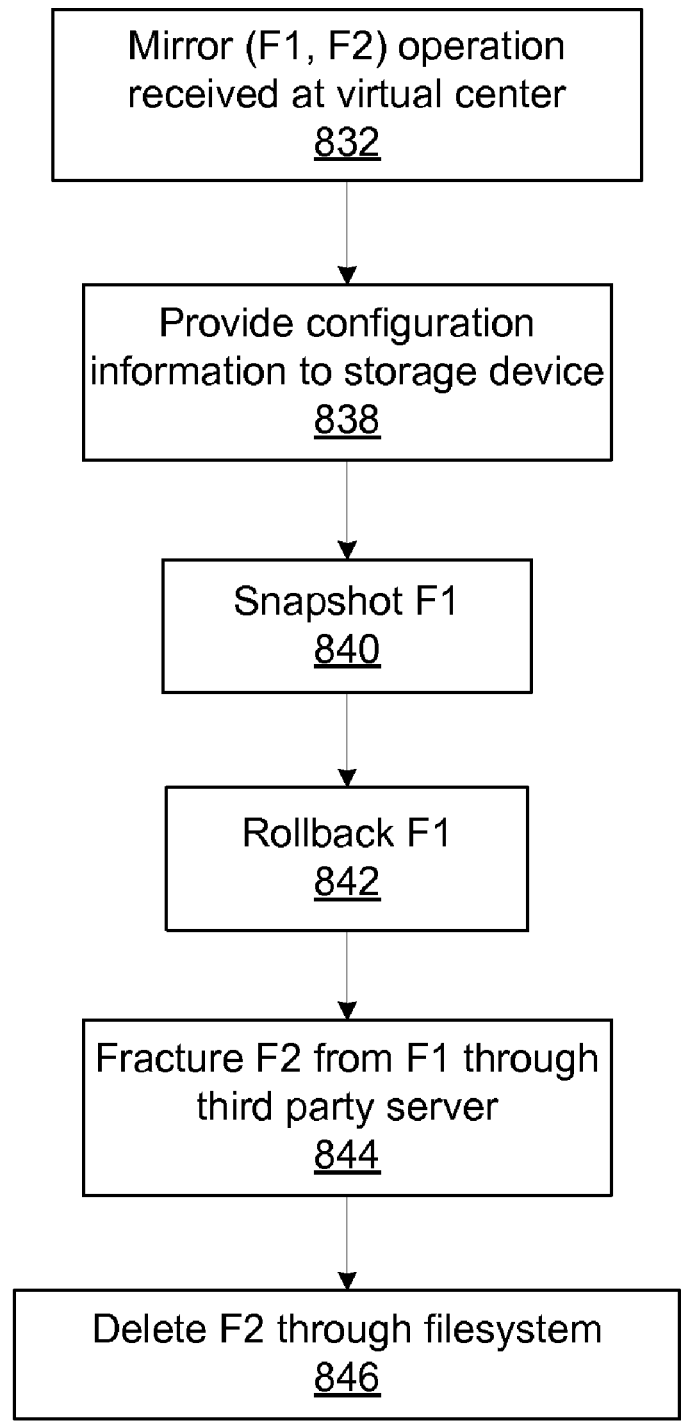
FIG. 8C is a flow diagram for performing mirroring using a third party server in accordance with one or more embodiments of the invention.

FIG. 8C is a flow diagram for performing mirroring using third party server 190 in accordance with one or more embodiments of the invention. At step 832, virtual center application 180 receives a mirror command, mirror (F1, F2), where the file F1 is mirrored to a new file, F2. Virtual disk 222 for the new file, F2, is created by VMKernel 208 in virtual machine execution space 210. Virtual center application 180 obtains the blocklist (or filehandle) for F2 from VMKernel 208.

Creating the new file, F2, on the storage device is necessary to complete the mirror operations. It is also necessary to provide configuration information to virtual center application 180 and the storage device (via third party server 190), so that storage system 106 or NAS device 185 is aware that F2 is a mirror of F1 in order for the storage device to properly maintain F2 as a mirror file. Therefore, at step 838, third party server 190 supplies the configuration information to the storage device, as previously described in conjunction with FIG. 8B. Also, without requiring any action by VMKernel 208, virtual center application 180 sets up the mirroring through third party server 190. The new file, F2, is created, F1 is copied to F2, and virtual center application 180 provides configuration information to the storage device that indicates F2 is a mirror of F1 through third party server 190.

Since file F2 is a mirror of file F1, all writes to F1 are also reflected to F2 by the storage device. At step 840, VMKernel 208 receives a command to snapshot file F1. A redo log is created by the storage device for F1. Since virtual center application 180 was provided configuration information indicating that F2 is a mirror of F1, a redo log is also created by VMkernel 208 on instruction from virtual center application 180 for F2. Virtual center application 180 then sets up a redo log for F2 that is a mirror of the redo log for F1. As data is written to F1 through the virtual machine file system, the data writes are captured in the redo log file for F1, and mirrored to the redo log file for F2. Virtual center application 180 sends the blocklists for data writes to third party server 190 for F1, and third party server 190 performs the mirroring for F2 and the redo log files for F1 and F2.

At step 842, virtual center application 180 receives a command to rollback F1 to the most recent snaphot. Virtual center application 180 and VMkernel 208 perform the rollback command for F1 and F2. If the redo log had not been created by virtual center application 180 and VMkernel 208, F2 would not be an accurate mirror of F1 after step 842 is completed. Because third party server 190 provides the storage device with configuration information 812 or 807, the storage device properly maintains F2 as a mirror of F1, including the creation and maintenance of the redo log. If the configuration information is not provided to the storage device, VMKernel 208 is burdened with the task of creating and maintaining F2 and the redo log. Third party server 190 beneficially allows VMkernel 208 or virtual center application 180 to control NAS and SAN capabilities of storage devices, NAS device 185 and storage system 106, respectively, in order to offload the movement of data from VMKernel 208.

At step 844, virtual center application 180 receives a command to fracture F2 from F1, and third party server 190 updates the configuration information for the storage devices to indicate that file F2 is no longer a mirror of file F1 and the F2 redo log is no longer a mirror of the F1 redo log. Virtual center application 180 deletes the F2 redo log through VMkernel 208. At step 846, virtual center application 180 receives a command to delete file F2. VMkernel 208 deletes the F2 file from VMFS 230, and third party server 190 deletes the F2 file from the storage devices. The previously described delete primitive may be used by third party server 190 to delete the F2 file, producing updated configuration information 807 or 812. Virtual center application 180 will also make corresponding changes to VM 212 configuration information at the time of fracture and deletion in order to decouple the affected file from the current state of the VM 212.

Offloading the data moving portion of storage operations, such as copying, from VMkernel 208 to the storage devices using third party server 190 improves the efficiency of the host system. Additionally, the transfer of configuration information associated with composite storage operations by third party server 190 to storage devices enables the integration of the storage device capabilities into the virtual machine workflow.

Offloading Storage Operations to a Switch

Switch 197 (shown in FIG. 9A) may be used to offload storage operations from VMkernel 208 by translating primitives, e.g. copy and clone, enroute to storage devices that do not support the new blacklist primitives. For example, new primitives such as copy and clone may be translated by switch 197 for execution by the physical storage devices, when a storage device is not configured to execute the blacklist primitive directly. This translation offloads the data moving portion of the storage operations from the file system. Another advantage of offloading storage operations through switch 197, is that switch 197 functions for storage systems provided by different vendors and therefore, allows for interoperability with existing and disparate storage systems. Switch 197 may perform the translation or a virtual target, such as another computer system 100 or 200, may be setup by the switch to perform the translation. Additionally, per-VM policies may be specified, and switch 197 may be configured to implement those policies. Example policies include RAID levels, snapshot frequency, data protection, QOS (quality of service), thin-provisioning, and the like. The policies effect the handling of the data movement when a storage operation is performed, and may be included in SCI 802, configuration information 807, or configuration information 812.

Figure 9A:
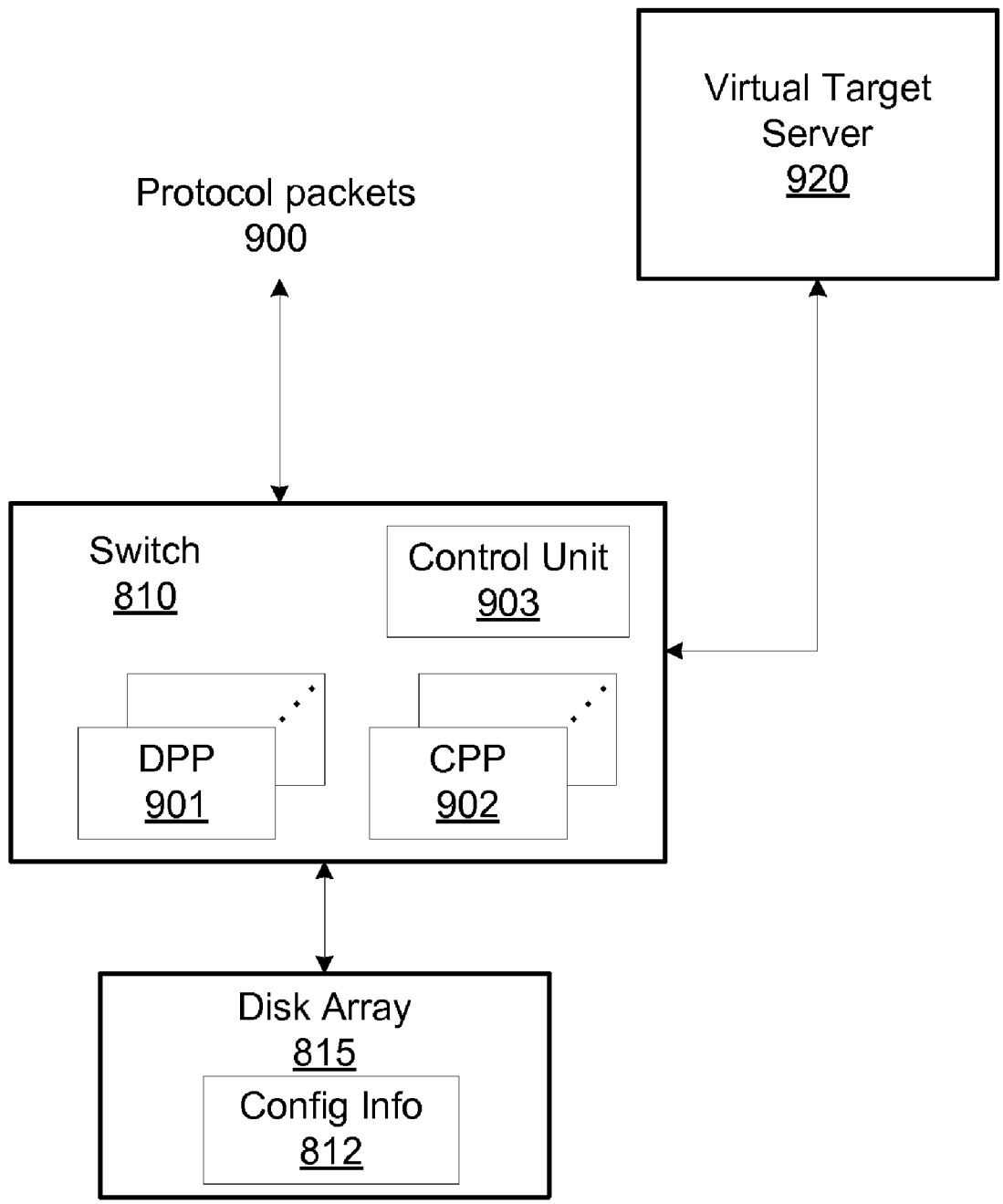
FIG. 9A is a functional block diagram illustrating a portion of the virtualized computer system topology of FIG. 8A, in which one or more embodiments of the invention may be practiced.

FIG. 9A is a functional block diagram illustrating a portion of the virtualized computer system topology of FIG. 8A in which one or more embodiments of the invention may be practiced. Switch 197 includes one or more data path processors, DPPs 901, and one of more control path processors, CPPs 902. Each DPP 901 routes protocol packets 900 received at one fabric port of switch 197 to another fabric port of switch 197 to route requests, including storage requests between sources and target destinations. Each CPP 902 is configured to provide intelligent processing, including the implementation of policies and translation of blacklist primitives that are not recognized by destination storage devices, such as storage system 106 or NAS device 185 to offload the data movement portion of the storage operations from VMKernel 208. Control unit 903 is configured to determine whether a received packet is processed by a DPP 901 or a CPP 902.

When a CPP 902 does not include support for translating a particular blacklist primitive, VMFS 230 or LVM 232 in the requesting computer system 100 or 200 instructs switch 197 to create a virtual target having a unique LUN identifier, such as virtual target server 920. CPP 902 is then programmed to communicate with virtual target server 920. Virtual target server 920 is configured as a proxy host that is able to translate blacklist primitives for execution by the storage devices. CPP 902 routes packets with blacklist primitives that it is not configured to translate to virtual target server 920. Virtual target server 920 translates the blacklist primitive for execution by the storage devices to offload the data movement portion of the storage operations from VMKernel 208. When the zero blocklist primitive is used, CPP 902 or virtual target server 920 may translate the zero blocklist primitive into SCSI WRITE SAME commands with the value of zero for each block <LUN ID, offset, length> in the sourceblocklist, as previously described in conjunction with FIG. 4A. When the clone blocklist primitive is used, CPP 902 or virtual target server 920 may translate the clone blocklist primitive into SCSI XCOPY commands for each block <LUN ID, offset, length> in the sourceblocklist, as previously described in conjunction with FIG. 5A.

Figure 9B:
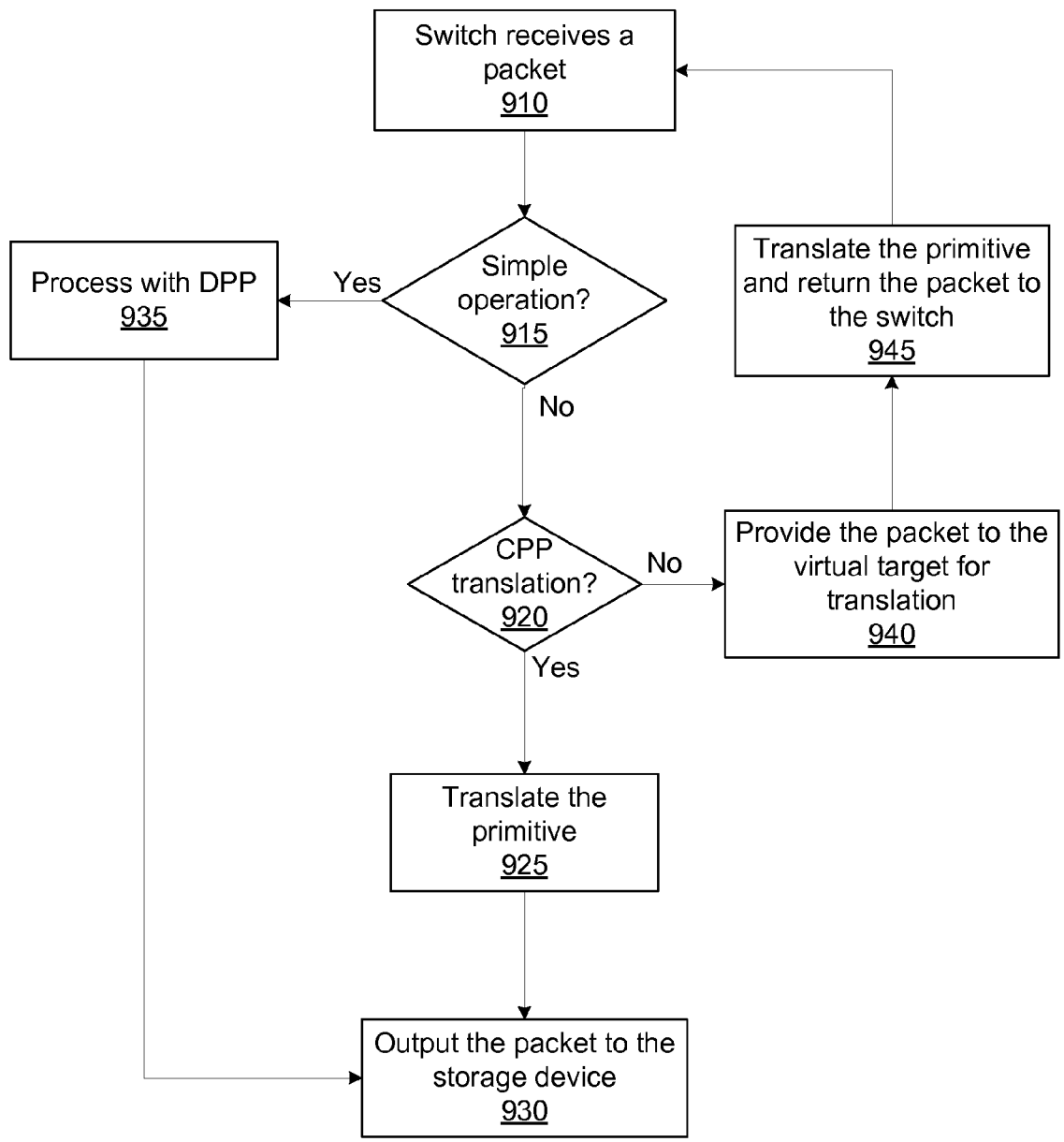
FIG. 9B is a flow diagram for offloading storage operations to a switch in accordance with one or more embodiments of the invention.

FIG. 9B is a flow diagram for offloading storage operations to switch 197, in accordance with one or more embodiments of the invention. At step 910, switch 197 receives a protocol packet including a storage operation. At decision step 915, control unit 903 determines if a blocklist primitive specified for the storage operation is a simple operation, such as a read or write storage operation that can be processed by a DPP 901.

If the operation included in the protocol packet is a simple one, then, at step 935, a DPP 901 processes the protocol packet. Otherwise, at decision step, step 920, CPP 902 determines if it is configured to translate the blocklist primitive into commands that can be executed by the storage device. If the CPP 902 is not configured to translate the blocklist primitive, then, at step 940, the CPP 902 routes the protocol packet to virtual target server 920 for translation. At step 945, virtual target server 920 receives the protocol packet including the translated blocklist primitive, translates the blocklist primitive into commands for execution by the target storage device, and returns the protocol packet with the translated blocklist primitive to switch 197 for routing to the target destination. A DPP 901 will process the packet and route it to the target destination.

Returning to step 920, if the CPP 902 determines that it is configured to translate the blocklist primitive, then at step 925, the CPP 902 translates the blocklist primitive into commands for execution by the target storage device. At step 930, the CPP 902 (or DPP 901 that processed the protocol packet at step 935) outputs the protocol packet to the target destination, e.g., storage device. The translation of the blacklist primitive into commands by either CPP 902 or virtual target server 920 offloads the storage operations from VMKernel 208.

Outside of the flow diagram shown in FIG. 9B, the host system determines whether or not the storage device is configured to execute blacklist primitives. A protocol packet including a blacklist primitive is provided by the host system for translation when a storage device is not configured to execute the primitive. If switch 197 is unable to translate a primitive, switch 197 reports an error to the host system and the host system handles the translation.

One or more embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. In a computer system including a host computer and a separate server, each connected to a storage system, a method of offloading storage operations from the host computer to the separate server, said method performed at the separate server and comprising:
   receiving a command to manage a file stored in the storage system for the host computer, wherein the command comprises copying at least a portion of the file to a second location in the storage system;
   transmitting a plurality of LUN block operations to the storage system, wherein the plurality of LUN block operations corresponds to execution of the copying by the storage system; and
   transmitting metadata to the storage system, wherein the metadata establishes a correspondence between the file and data copied by the storage device to the second location during execution by the storage system of the plurality of LUN block operations, whereby, upon receiving subsequent operations relating to the file for the host computer, the storage system accesses the metadata and performs corresponding operations determined based on the subsequent operations and the metadata for the copied data in the second location in the storage system.

2. The method according to claim 1, wherein transmitting the plurality of LUN block operations comprises transmitting a single operation to the storage system, wherein the plurality of LUN block operations are embedded into a section of the single operation that is specified by the single operation to contain additional operations.

3. The method according to claim 1, wherein the metadata is arranged in a format specific to a vendor of the storage system.

4. The method according to claim 3, wherein the file represents a virtual disk of a virtual machine running on the host computer.

5. The method according to claim 4, further comprising receiving configuration information relating to the attributes of the virtual machine and generating the metadata based on the received configuration information.

6. The method according to claim 5, wherein the received configuration information indicates that the virtual disk of the virtual machine is to be mirrored.

7. The method according to claim 1, wherein the command is a command to mirror the file to the second location and the metadata indicates that the second location stores a mirror of the file.

8. A computer system comprising:
   a host computer configured to provide a file system that maintains location information for files;
   a storage system, connected to the host computer, having storage devices that store the files and are presented to the host computer as one or more logical unit numbers (LUNs); and
   a separate server that is coupled between the host computer and the storage system and configured to receive a composite storage operation for the storage system, obtain location information from the file system for a file that is stored on the storage devices, and generate configuration information associated with the composite storage operation at the separate server and supply the configuration information and the location information to the storage system,
   wherein the storage system upon receiving subsequent operations relating to the file for the host computer, the storage system accesses the configuration information and performs corresponding operations determined based on the subsequent operations and the metadata for the file using the location information in the storage system.

9. The computer system according to claim 8, wherein the location information is a list of blocks, and each block identifies a contiguous region of a LUN, an offset value, and length.

10. The computer system according to claim 8, wherein the location information is a file handle and the storage devices are network accessible storage devices.

11. The computer system according to claim 8, wherein the composite storage operation is mirroring a first file that is stored on the storage devices and the configuration information indicates that a second file is a mirror of the first file.

12. The computer system according to claim 11, further comprising receiving at the separate server changes made to the first file from the file system and maintaining a redo log for the second file based on the changes.

13. The computer system according to claim 8, wherein the configuration information is supplied from the separate server to the storage system through an out of band path that bypasses the file system.

14. The computer system according to claim 13, wherein the storage system includes a network interface card that is coupled to the separate server by the out of band path and configured to receive the configuration information.

15. A computer readable storage medium storing instructions for offloading storage operations from a host computer to a separate server, each connected to a storage system, performing at the separate server the steps of:
   receiving a command to manage a file stored in the storage system for the host computer, wherein the command comprises copying at least a portion of the file to a second location in the storage system;
   transmitting a plurality of LUN block operations to the storage system, wherein the plurality of LUN block operations corresponds to execution of the copying by the storage system; and
   transmitting metadata to the storage system, wherein the metadata establishes a correspondence between the file and data copied by the storage device to the second location during execution by the storage system of the plurality of LUN block operations, whereby, upon receiving subsequent operations relating to the file for the host computer, the storage system accesses the metadata and performs corresponding operations determined based on the subsequent operations and the metadata for the copied data in the second location in the storage system.

16. The computer readable storage medium according to claim 15, wherein transmitting the plurality of LUN block operations comprises transmitting a single operation to the storage system, wherein the plurality of LUN block operations are embedded into a section of the single operation that is specified by the single operation to contain additional operations.

17. The computer readable storage medium according to claim 15, wherein the metadata is arranged in a format specific to a vendor of the storage system.

18. The computer readable storage medium according to claim 17, wherein the file represents a virtual disk of a virtual machine running on the host computer.

19. The computer readable storage medium according to claim 18, further comprising receiving configuration information relating to the attributes of the virtual machine and generating the metadata based on the received configuration information.

20. The computer readable storage medium according to claim 19, wherein the received configuration information indicates that the virtual disk of the virtual machine is to be mirrored.

21. The computer readable storage medium according to claim 15, wherein the command is a command to mirror the file to the second location and the metadata indicates that the second location stores a mirror of the file.

* * * * *